(12) United States Patent
Tsai et al.

(10) Patent No.: US 8,605,368 B2
(45) Date of Patent: Dec. 10, 2013

(54) IMAGE CAPTURING OPTICAL SYSTEM

(75) Inventors: Tsung-Han Tsai, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/612,810

(22) Filed: Sep. 12, 2012

(65) Prior Publication Data

US 2013/0188263 A1    Jul. 25, 2013

(30) Foreign Application Priority Data

Jan. 20, 2012   (TW) .............................. 101102554 A

(51) Int. Cl.
  *G02B 13/18*    (2006.01)
  *G02B 9/60*    (2006.01)

(52) U.S. Cl.
  USPC ............ 359/714; 359/740; 359/764; 359/765

(58) Field of Classification Search
  USPC .................... 359/714, 740, 764, 765
  See application file for complete search history.

(56) References Cited

U.S. PATENT DOCUMENTS

| | | | |
|---|---|---|---|
| 7,869,142 B2 | 1/2011 | Chen et al. | |
| 8,000,030 B2 | 8/2011 | Tang | |
| 8,000,031 B1 | 8/2011 | Tsai | |
| 2012/0188655 A1* | 7/2012 | Tsai et al. | 359/714 |
| 2012/0300315 A1* | 11/2012 | Chen et al. | 359/714 |
| 2012/0314302 A1* | 12/2012 | Tang et al. | 359/714 |
| 2012/0327520 A1* | 12/2012 | Tsai et al. | 359/714 |
| 2012/0327522 A1* | 12/2012 | Tsai et al. | 359/715 |
| 2013/0021680 A1* | 1/2013 | Chen et al. | 359/714 |

* cited by examiner

*Primary Examiner* — Evelyn A. Lester
(74) *Attorney, Agent, or Firm* — CKC & Partners Co., Ltd.

(57) ABSTRACT

An image capturing optical system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element has refractive power, wherein the surfaces of the third lens element are aspheric. The fourth lens element has positive refractive power, wherein the surfaces of the fourth lens element are aspheric. The fifth lens element with refractive power is made of plastic material, and has a concave image-side surface, wherein the surfaces of the fifth lens element are aspheric, and the fifth lens element has inflection points formed on at least one of the surfaces thereof.

23 Claims, 22 Drawing Sheets

IMAGE CAPTURING OPTICAL SYSTEM

RELATED APPLICATIONS

The application claims priority to Taiwan Application Serial Number 101102554, filed Jan. 20, 2012, which is herein incorporated by reference.

BACKGROUND

1. Technical Field

The present invention relates to an image capturing optical system. More particularly, the present invention relates to a compact image capturing optical system applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure. Due to the popularity of mobile products with high-end specifications, such as smart phones and PDAs (Personal Digital Assistants), the pixel and image-quality requirements of the compact optical lens system have increased rapidly. However, the conventional four-element lens structure cannot satisfy the requirements of the compact optical lens system.

Another conventional compact optical lens system with five-element lens structure enhances image quality and resolving power. However, the thickness of the lenses, the distance between the lenses, and the distance between the lenses and the image plane cannot be reduced effectively, so that the size and the total track length of the image capturing optical system cannot be reduced.

SUMMARY

According to one aspect of the present disclosure, an image capturing optical system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element has refractive power, herein an object-side surface and an image-side surface of the third lens element are aspheric. The fourth lens element has positive refractive power, wherein an object-side surface and an image-side surface of the fourth lens element are aspheric. The fifth lens element with refractive power is made of plastic material, and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the second lens element is R3, a curvature radius of the image-side surface of the second lens element is R4, a focal length of the image capturing optical system is f, an axial distance between the object-side surface of the first lens element and the image-side surface of the fifth lens element is Td, an air conversion distance between the image-side surface of the fifth lens element and an image plane is BFL, and a focal length of the fourth lens element is f4, the following relationships are satisfied:

$0 < R3/R4 < 1.0;$ $4 \text{ mm}^2 < (Td \times f) + (BFL \times f) < 10 \text{ mm}^2;$ and $0 < f/f4 < 2.2.$ According to another aspect of the present disclosure, an image capturing optical system includes, in order from an object side to an image side, a first lens element, a second lens element, a third lens element, a fourth lens element and a fifth lens element. The first lens element with positive refractive power has a convex object-side surface. The second lens element with negative refractive power has a concave object-side surface and a convex image-side surface. The third lens element has refractive power, wherein an object-side surface and an image-side surface of the third lens element are aspheric. The fourth lens element with positive refractive power is made of plastic material, wherein an object-side surface and an image-side surface of the fourth lens element are aspheric. The fifth lens element with negative refractive power is made of plastic material and has a concave image-side surface, wherein an object-side surface and the image-side surface of the fifth lens element are aspheric, and the fifth lens element has at least one inflection point formed on at least one of the object-side surface and the image-side surface thereof. When a curvature radius of the object-side surface of the second lens element is R3, a curvature radius of the image-side surface of the second lens element is R4, a focal length of the image capturing optical system is f, an axial distance between the object-side surface of the first lens element and the image-side surface of the fifth lens element is Td, an air conversion distance between the image-side surface of the fifth lens element and an image plane is BFL, a maximum image height of the image capturing optical system is ImgH, an axial distance between the object-side surface of the first lens element and the image plane is TTL, and the following relationships are satisfied:

$0 < R3/R4 < 1.0;$ $4 \text{ mm}^2 < (Td \times f) + (BFL \times f) < 10 \text{ mm}^2;$ and $TTL/\text{Img}H < 1.7.$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
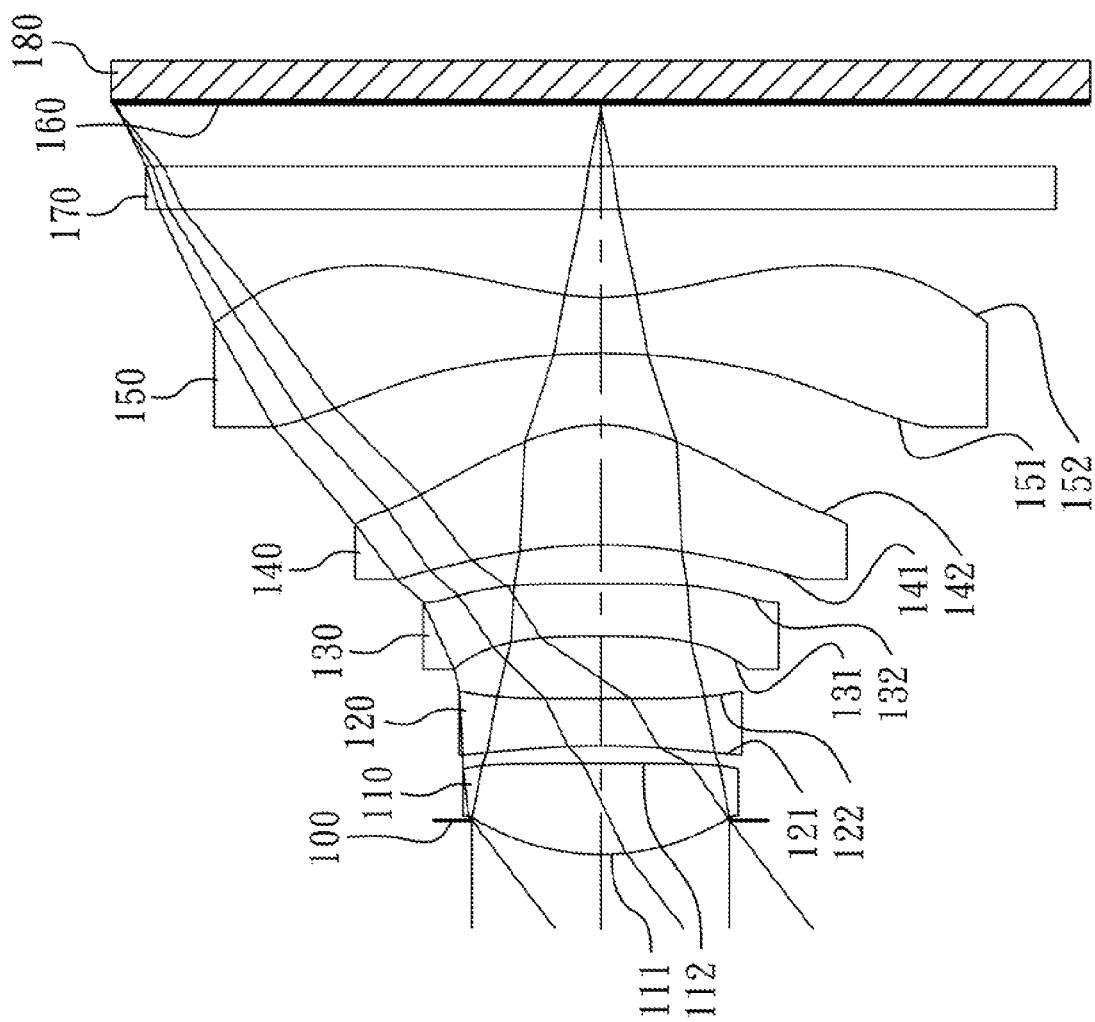
FIG. 1 is a schematic view of an image capturing optical system according to the 1st embodiment of the present disclosure.

An image capturing optical system includes, in order from an object side to an image side, a first lens element, a second lens element, a third lens element, a fourth lens element and a fifth lens element.

The first lens element with positive refractive power has a convex object-side surface, so that the positive refractive power of the first lens element can be adjusted for reducing the total track length of the image capturing optical system.

The second lens element with negative refractive power corrects the aberration generated from the first lens element with positive refractive power. The second lens element has a concave object-side surface and a convex image-side surface, so that the astigmatism of the image capturing optical system can be corrected. Furthermore, the second lens element has inflection points formed on the image-side surface thereof, so that the incident angle of the off-axis field on the image sensor can be effectively reduced and the aberration can be corrected as well.

The third lens element with refractive power has a convex image-side surface, so that the astigmatism of the image capturing optical system can be corrected.

The fourth lens element with positive refractive power provides partial positive refractive power of the image capturing optical system for balancing the distribution of the positive refractive power of the first lens element, the excessive spherical aberration generated from the first lens element can be avoided for reducing the sensitivity of the image capturing optical system. The fourth lens element has a concave object-side surface and the convex image-side surface, so that the astigmatism of the image capturing optical system can be reduced.

The fifth lens element with negative refractive power has a concave image-side surface, so that the principal point of the image capturing optical system can be positioned away from the image plane, and the total track length of the image capturing optical system can be reduced so as to maintain the compact size of the image capturing optical system. Furthermore, the fifth lens element has inflection points formed on at least one of the object-side surface and the image-side surface thereof, so that the incident angle of the off-axis field on the image sensor can be effectively reduced and the aberration can be corrected as well.

When a curvature radius of the object-side surface of the second lens element is R3, and a curvature radius of the image-side surface of the second lens element is R4, the following relationship is satisfied:

$$0<R3/R4<1.0$$

Therefore, the refractive power of the second lens element can be adjusted properly for correcting the aberration generated from the first lens element.

R3 and R4 can further satisfy the following relationship:

$$0<R3/R4<0.5.$$

When a focal length of the image capturing optical system is f, an axial distance between the object-side surface of the first lens element and the image-side surface of the fifth lens element is Td, and an air conversion distance between the image-side surface of the fifth lens element and an image plane is BFL, the following relationship is satisfied:

$$4\ mm^2<(Td\times f)+(BFL\times f)<10\ mm^2.$$

Therefore, the distances between the lens elements are proper for reducing the total track length of the image capturing optical system.

When the focal length of the image capturing optical system is f, and a focal length of the fourth lens element is f4, the following relationship is satisfied:

$$0<f/f4<2.2.$$

Therefore, the refractive power of the fourth lens element is proper can avoid the excessive spherical aberration generated from the first lens element, and reduce the sensitivity of the image capturing optical system.

f and f4 can further satisfy the following relationship:

$$0.4<f/f4<1.7.$$

When an axial distance between the first lens element and the second lens element is T12, and an axial distance between the fourth lens element and the fifth lens element is T45, the following relationship is satisfied:

$$0.05 < T12/T45 < 0.65.$$

Therefore, the fabrication of the image capturing optical system can be easier and the total track length of the image capturing optical system can be reduced by the proper adjustment of the distance between the lens elements.

When a maximum image height of the image capturing optical system is ImgH, and an axial distance between the object-side surface of the first lens element and the image plane is TTL, the following relationship is satisfied:

$$TTL/ImgH < 1.7.$$

Therefore, the image capturing optical system with short total track length can maintain the compact size for portable electronic products.

TTL and ImgH can further satisfy the following relationship:

$$TTL/ImgH < 1.55.$$

When the axial distance between the object-side surface of the first lens element and the image plane is TTL, the following relationship is satisfied:

$$1.0 \text{ mm} < TTL < 3.5 \text{ mm}.$$

Therefore, the compact size of the image capturing optical system can be maintained.

When a curvature radius of the object-side surface of the first lens element is R1, and a curvature radius of the image-side surface of the first lens element is R2, the following relationship is satisfied:

$$-0.5 < R1/R2 < 0.5.$$

Therefore, the total track length of the image capturing optical system can be reduced by adjusting the curvature of the surfaced of the first lens element.

When the focal length of the image capturing optical system is f, and a focal length of the third lens element is f3, the following relationship is satisfied:

$$-0.5 < f/f3 < 0.5.$$

Therefore, the astigmatism of the image capturing optical system can be corrected by adjusting the refractive power of the third lens element.

When a maximal field of view is FOV, the following relationship is satisfied:

$$73 \text{ degrees} < FOV < 85 \text{ degrees}.$$

Therefore, the wider range of the image can be captured by adjusting the field of view of the image capturing optical system properly.

When the focal length of the image capturing optical system is f, and a focal length of the second lens element is f2, the following relationship is satisfied:

$$-1.0 < f/f2 < -0.2.$$

Therefore, the aberration generated from the first lens element can be corrected by adjusting the refractive power of the second lens element.

When the focal length of the image capturing optical system is f, the following relationship is satisfied:

$$1.5 \text{ mm} < f < 3.0 \text{ mm}.$$

Therefore, the focal length of the image capturing optical system is proper for maintaining the compact size thereof.

According to the image capturing optical system of the present disclosure, the lens elements thereof can be made of glass or plastic material. When the lens elements are made of glass material, the distribution of the refractive power of the image capturing optical system may be more flexible to design. When the lens elements are made of plastic material, the cost of manufacture can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image capturing optical system can also be reduced.

According to the image capturing optical system of the present disclosure, when a lens element has a convex surface, it indicates that the paraxial region of the surface is convex; and when a lens element has a concave surface, it indicates that the paraxial region of the surface is concave.

According to the image capturing optical system of the present disclosure, the image capturing optical system can include at least one stop, such as an aperture stop, glare stop, field stop, etc. Said glare stop or said field stop is allocated for reducing stray light while retaining high image quality. Furthermore, when a stop is an aperture stop, the position of the aperture stop within an optical system can be arbitrarily placed in front of the entire lens assembly, within the lens assembly, or in front of the image plane in accordance with the preference of the optical designer, in order to achieve the desirable optical features or higher image quality produced from the optical system.

According to the above description of the present disclosure, the following 1st-11th specific embodiments are provided for further explanation.

1st Embodiment

Figure 2:
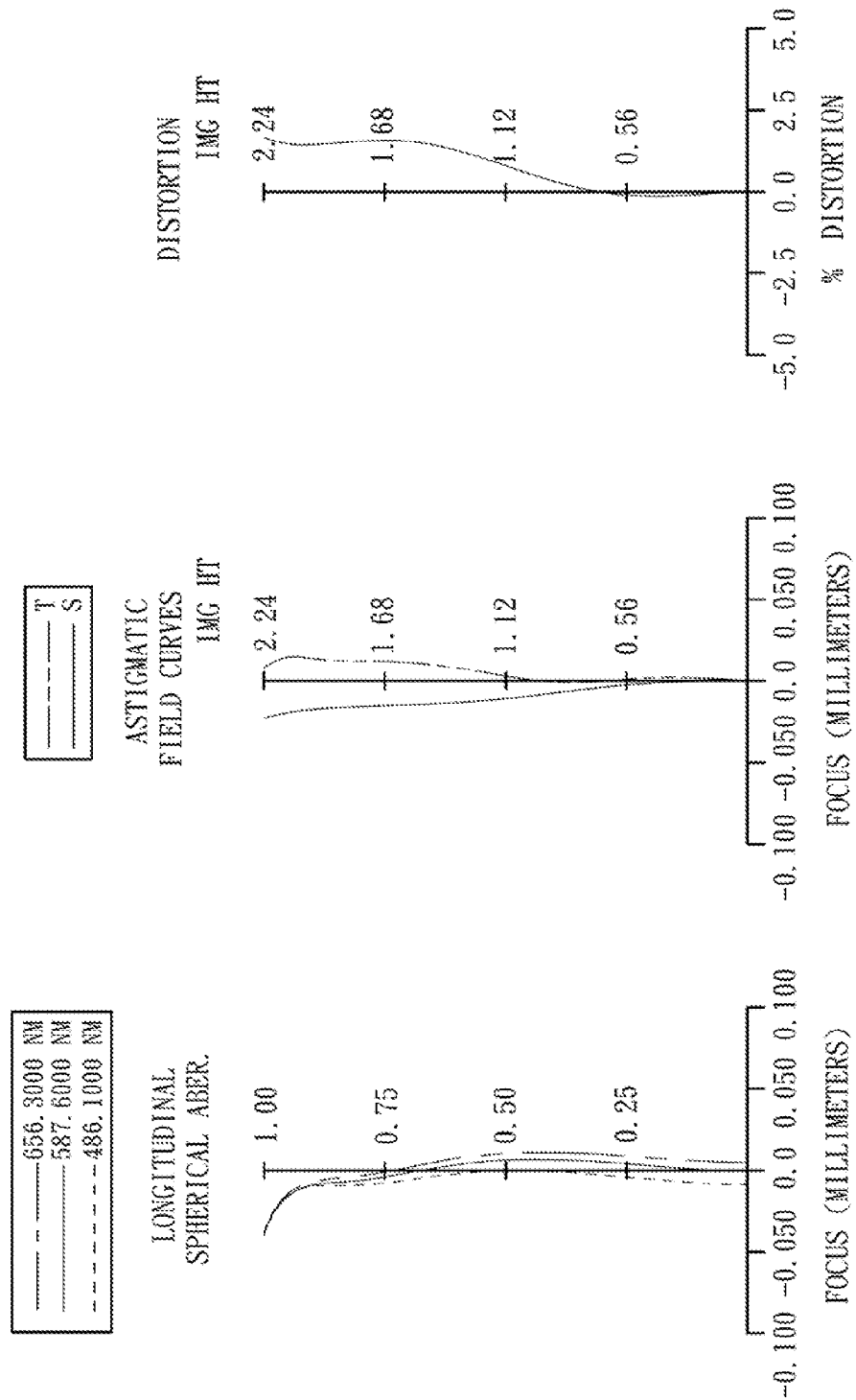
FIG. 2 shows spherical aberration curves, astigmatic field curves and a distortion curve of the image capturing optical system according to the 1st embodiment.

FIG. 1 is a schematic view of an image capturing optical system according to the 1st embodiment of the present disclosure. FIG. 2 shows spherical aberration curves, astigmatic field curves and a distortion curve of the image capturing optical system according to the 1st embodiment. In FIG. 1, the image capturing optical system includes, in order from an object side to an image side, an aperture stop 100, the first lens element 110, the second lens element 120 the third lens element 130, the fourth lens element 140, the fifth lens element 150, an IR-cut filter 170, an image plane 160 and an image sensor 180.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a concave object-side surface 121 and a convex image-side surface 122, and is made of plastic material. The object-side surface 121 and the image-side surface 122 of the second lens element 120 are aspheric. Furthermore, the second lens element 120 has inflection points formed on the mage-side surface 122 thereof.

The third lens element 130 with negative refractive power has a concave object-side surface 131 and a convex image-side surface 132, and is made of plastic material. The object-side surface 131 and the image-side surface 132 of the third lens element 130 are aspheric.

The fourth lens element 140 with positive refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a concave image-side surface 152, and is made of plastic material. The object-side surface 151 and the image-side surface 152 of the fifth lens element 150 are aspheric. Furthermore, the fifth lens element 150 has inflection points formed on the image-side surface 152 thereof.

The IR-cut filter 170 is made of glass, and located between the fifth lens element 150 and the image plane 160, and will not affect the focal length of the image capturing optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing optical system according to the 1st embodiment, when a focal length of the image capturing optical system is f, an f-number of the image capturing optical system is Fno, and a maximal field of view is FOV, these parameters have the following values:

f=2.89 mm;

Fno=2.45; and

FOV=74.8 degrees.

In the image capturing optical system according to the 1st embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, and a curvature radius of the image-side surface 122 of the second lens element 120 is R4, the following relationships are satisfied:

$R1/R2=-0.01$; and $R3/R4=0.03$.

In the image capturing optical system according to the 1st embodiment, when an axial distance between the first lens element 110 and the second lens element 120 is T12, and an axial distance between the fourth lens element 140 and the fifth lens element 150 is T45, the following relationship is satisfied:

$T12/T45=0.24$.

In the image capturing optical system according to the 1st embodiment, when an air conversion distance between the image-side surface 152 of the fifth lens element 150 and an image plane 160 is BFL with a measurement excluding the IR-cut filter 170, an axial distance between the object-side surface 111 of the first lens element 110 and the image-side surface 152 of the fifth lens element 150 is Td, and the focal length of the image capturing optical system is f, the following relationship is satisfied:

$(Td \times f) + (BFL \times f) = 9.78$ mm$^2$.

In the image capturing optical system according to the 1st embodiment, when an axial distance between the object-side surface 111 of the first lens element 110 and the image plane 160 is TTL, the following relationship is satisfied:

$TTL=3.38$ mm.

In the image capturing optical system according to the 1st embodiment, when the focal length of the image capturing optical system is f, a focal length of the second lens element 120 is f2, a focal length of the third lens element 130 is f3, and a focal length of the fourth lens element 140 is f4, the following relationships are satisfied:

$f/f2=-0.56$;

$f/f3=-0.25$; and $f/f4=1.67$.

In the image capturing optical system according to the 1st embodiment, when the maximum image height of the image capturing optical system is ImgH which here is a half of the diagonal length of the photosensitive area of the image sensor 180 on the image plane 160, and the axial distance between the object-side surface 111 of the first lens element 110 and the image plane 160 is TTL, the following relationship is satisfied:

$TTL/ImgH=1.51$.

The detailed optical data of the 1st embodiment are shown in Table 1 and the aspheric surface data are shown in Table 2 below.

TABLE 1

1st Embodiment
f = 2.89 mm, Fno = 2.45, HFOV = 37.4 deg.

| Surface # |          | Curvature Radius  | Thickness | Material | Index | Abbe # | Focal length |
|-----------|----------|-------------------|-----------|----------|-------|--------|--------------|
| 0         | Object   | Plano             | Infinity  |          |       |        |              |
| 1         | Ape. Stop| Plano             | −0.156    |          |       |        |              |
| 2         | Lens 1   | 1.099440 (ASP)    | 0.417     | Plastic  | 1.544 | 55.9   | 2.00         |
| 3         |          | −82.372300 (ASP)  | 0.078     |          |       |        |              |
| 4         | Lens 2   | −3.192800 (ASP)   | 0.220     | Plastic  | 1.640 | 23.3   | −5.17        |
| 5         |          | −93.808600 (ASP)  | 0.285     |          |       |        |              |
| 6         | Lens 3   | −6.736600 (ASP)   | 0.240     | Plastic  | 1.640 | 23.3   | −11.40       |
| 7         |          | −89.126600 (ASP)  | 0.179     |          |       |        |              |
| 8         | Lens 4   | −2.247610 (ASP)   | 0.550     | Plastic  | 1.544 | 55.9   | 1.73         |
| 9         |          | −0.720030 (ASP)   | 0.326     |          |       |        |              |

TABLE 1-continued

1st Embodiment
f = 2.89 mm, Fno = 2.45, HFOV = 37.4 deg.

| Surface # | | Curvature Radius | Thickness | Material | Index | Abbe # | Focal length |
|---|---|---|---|---|---|---|---|
| 10 | Lens 5 | −2.870970 (ASP) | 0.260 | Plastic | 1.544 | 55.9 | −1.50 |
| 11 | | 1.172920 (ASP) | 0.400 | | | | |
| 12 | IR-cut filter | Plano | 0.200 | Glass | 1.517 | 64.2 | — |
| 13 | | Plano | 0.294 | | | | |
| 14 | Image | Plano | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | −5.29714E+00 | −5.00000E+01 | −4.77580E+01 | −5.00000E+01 | −1.00000E+00 |
| A4 = | 4.74951E−01 | −3.58637E−02 | 2.22029E−02 | 2.10591E−01 | −4.93498E−01 |
| A6 = | −5.22347E−01 | 2.77005E−02 | 1.69071E−01 | −9.60221E−02 | −3.57726E−01 |
| A8 = | 7.25655E−01 | −7.23864E−01 | 5.87160E−02 | 4.85417E−01 | 1.20436E+00 |
| A10 = | −8.64537E−01 | 8.35565E−01 | −3.44200E+00 | −2.07191E+00 | −2.01455E+00 |
| A12 = | −5.19251E−01 | −3.04364E+00 | 7.91997E+00 | 2.84703E+00 | 3.66405E−01 |
| A14 = | −3.31404E−01 | 2.22908E+00 | −4.23425E+00 | 5.61982E−01 | 1.92064E−07 |

| Surface # | 7 | 8 | 9 | 10 | 11 |
|---|---|---|---|---|---|
| k = | −1.00000E+00 | 1.83907E+00 | −3.23518E+00 | −3.92286E+01 | −1.08876E+01 |
| A4 = | −3.25479E−01 | 6.93226E−02 | −1.81320E−01 | −4.77670E−02 | −1.01866E−01 |
| A6 = | −1.26064E−01 | 1.80204E−01 | 4.34202E−01 | −4.84966E−02 | 4.09869E−02 |
| A8 = | 4.66071E−01 | −8.04686E−01 | −4.30447E−01 | 4.15799E−02 | −1.98127E−02 |
| A10 = | −2.50141E−01 | 1.50609E+00 | 3.17170E−01 | −5.18292E−03 | 6.76715E−03 |
| A12 = | 4.35525E−01 | −1.11814E+00 | −1.24884E−01 | −1.81528E−03 | −1.58712E−03 |
| A14 = | 1.93913E−07 | 2.46406E−01 | 7.94185E−03 | 3.62972E−04 | 1.79077E−04 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
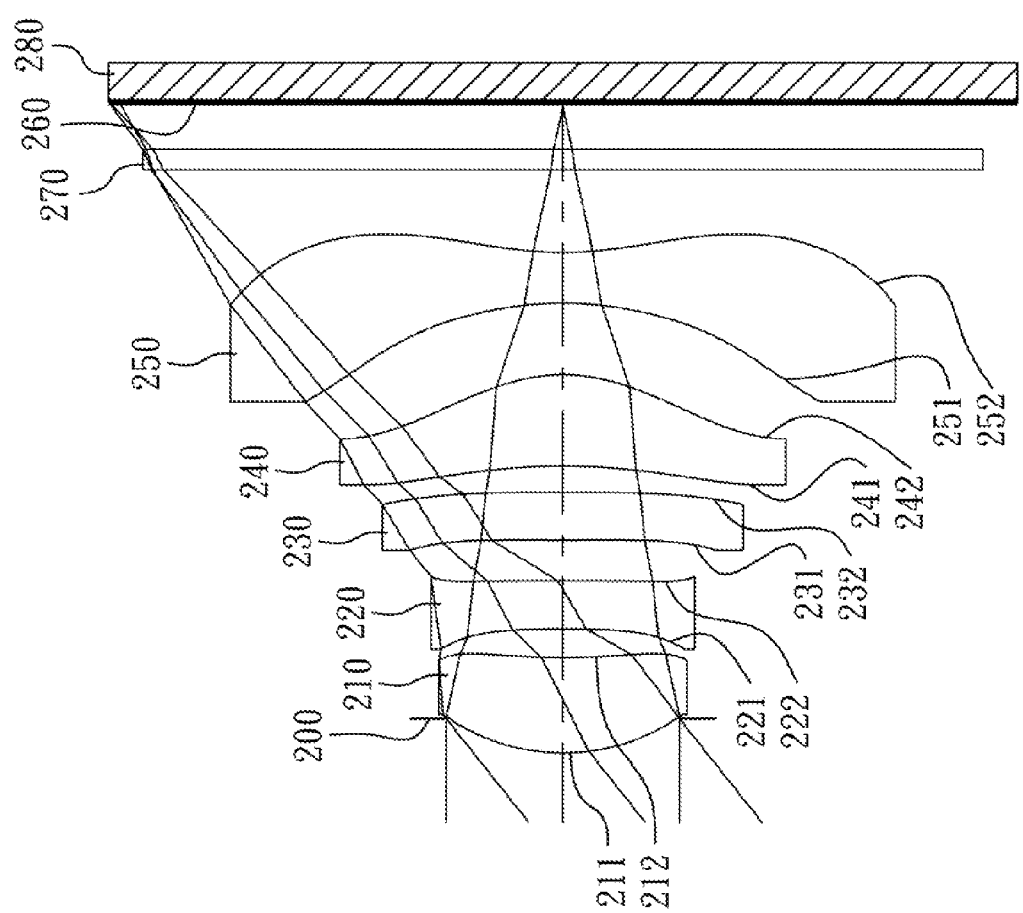
FIG. 3 is a schematic view of an image capturing optical system according to the 2nd embodiment of the present disclosure.
Figure 4:
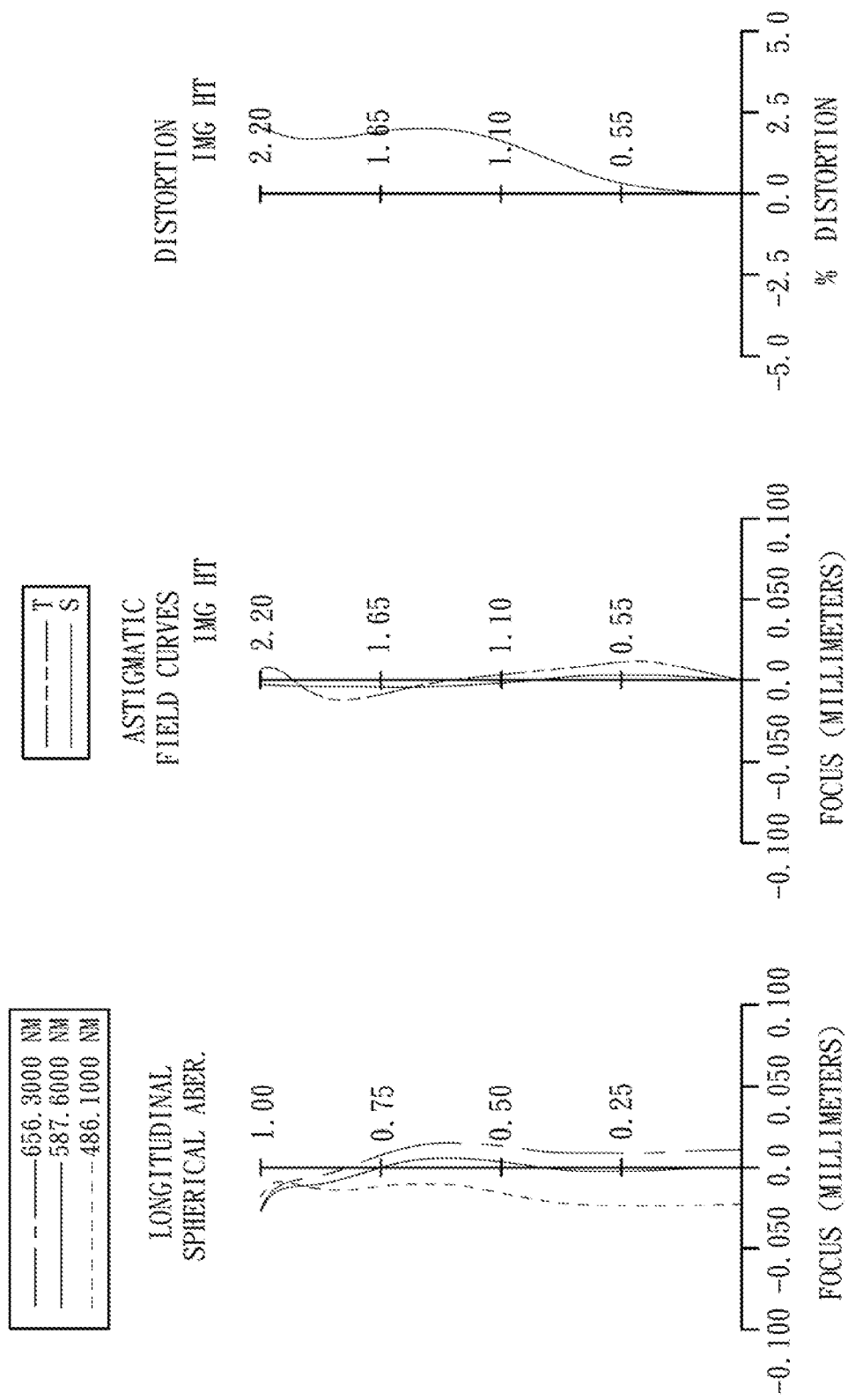
FIG. 4 shows spherical aberration curves, astigmatic field curves and a distortion curve of the image capturing optical system according to the 2nd embodiment.

FIG. 3 is a schematic view of an image capturing optical system according to the 2nd embodiment of the present disclosure. FIG. 4 shows spherical aberration curves, astigmatic field curves and a distortion curve of the image capturing optical system according to the 2nd embodiment. In FIG. 3, the image capturing optical system includes, in order from an object side to an image side, an aperture stop 200, the first lens element 210, the second lens element 220, the third lens element 230, the fourth lens element 240, the fifth lens element 250, an IR-cut filter 270, an image plane 260 and an image sensor 280.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a concave object-side surface 221 and a convex image-side surface 222, and is made of plastic material. The object-side surface 221 and the image-side surface 222 of the second lens element 220 are aspheric. Furthermore, the second lens element 220 has inflection points formed on the image-side surface 222 thereof.

The third lens element 230 with positive refractive power has a convex object-side surface 231 and a convex image-side surface 232, and is made of plastic material. The object-side surface 231 and the mage-side surface 232 of the third lens element 230 are aspheric.

The fourth lens element 240 with positive refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a concave object-side surface 251 and a concave image-side surface 252, and is made of plastic material. The object-side surface 251 and the mage-side surface 252 of the fifth lens element 250 are aspheric. Furthermore, the fifth lens element 250 has inflection points formed on the image-side surface 252 thereof.

The IR-cut filter 270 is made of glass, and located between the fifth lens element 250 and the image plane 260, and will not affect the focal length of the image capturing optical system.

The detailed optical data of the 2nd embodiment are shown in Table 3 and the aspheric surface data are shown in Table 4 below.

TABLE 3

2nd Embodiment
f = 2.71 mm, Fno = 2.40, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.164 | | | | |
| 2 | Lens 1 | 1.006040 (ASP) | 0.461 | Plastic | 1.544 | 55.9 | 2.51 |
| 3 | | 3.207600 (ASP) | 0.140 | | | | |
| 4 | Lens 2 | −5.432400 (ASP) | 0.230 | Plastic | 1.650 | 21.4 | −8.85 |
| 5 | | −100.000000 (ASP) | 0.200 | | | | |
| 6 | Lens 3 | 25.532700 (ASP) | 0.230 | Plastic | 1.650 | 21.4 | 31.33 |
| 7 | | −100.000000 (ASP) | 0.126 | | | | |
| 8 | Lens 4 | −2.747490 (ASP) | 0.445 | Plastic | 1.544 | 55.9 | 1.94 |
| 9 | | −0.806680 (ASP) | 0.347 | | | | |
| 10 | Lens 5 | −1.603160 (ASP) | 0.245 | Plastic | 1.544 | 55.9 | −1.42 |
| 11 | | 1.566250 (ASP) | 0.400 | | | | |
| 12 | IR-cut filter | Plano | 0.100 | Glass | 1.517 | 64.2 | — |
| 13 | | Plano | 0.229 | | | | |
| 14 | Image | Plano | — | | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | −3.81650E+00 | −1.38645E+01 | −1.00000E+00 | −1.00000E+00 | −1.00000E+00 |
| A4 = | 4.88696E−01 | −1.28972E−01 | −3.59258E−01 | −1.11831E−01 | −1.90817E−01 |
| A6 = | −5.62283E−01 | −1.73590E−01 | −4.94946E−01 | 1.34311E−01 | −1.08350E−01 |
| A8 = | 1.69554E+00 | −2.44337E+00 | 5.24865E−01 | 4.35266E−01 | 6.96752E−01 |
| A10 = | −2.62932E+00 | 1.17893E+00 | −4.09148E+00 | 4.85202E−01 | −1.30175E+00 |
| A12 = | −3.56335E−01 | −3.12162E+00 | 7.69165E+00 | 2.83455E+00 | 4.92118E−01 |
| A14 = | −3.31404E−01 | 2.22908E+00 | −4.23425E+00 | 4.43961E−01 | 1.50765E−01 |

| Surface # | 7 | 8 | 9 | 10 | 11 |
|---|---|---|---|---|---|
| k = | −1.00000E+00 | 3.22056E−02 | −3.92231E+00 | −1.32062E+01 | −1.57170E+01 |
| A4 = | −7.36458E−02 | 1.00605E−01 | −1.61581E−01 | −1.71357E−01 | −1.30605E−01 |
| A6 = | −2.38171E−01 | 1.44888E−01 | 4.77664E−01 | −1.55167E−02 | 5.22063E−02 |
| A8 = | 4.63221E−01 | −8.27869E−01 | −4.45904E−01 | 5.63002E−02 | −2.51114E−02 |
| A10 = | −3.37650E−01 | 1.50885E+00 | 3.02489E−01 | −4.17553E−03 | 7.51976E−03 |
| A12 = | 2.92354E−01 | −1.08810E+00 | −1.26237E−01 | −2.77007E−03 | −1.47072E−03 |
| A14 = | −2.17507E−01 | 2.59343E−01 | 1.79379E−02 | −4.16677E−04 | 1.10518E−04 |

In the optical image lens system according to the 2nd embodiment, the definitions of f, Fno, FOV, R1, R2, R3, R4, T12, T45, Td, BFL, TTL, f2, f3, f4 and ImgH are the same as those stated in the 1st embodiment with corresponding values for the 2nd embodiment. Moreover, these parameters can be calculated from Table 3 and Table 4 as the following values and satisfy the following relationships:

| | |
|---|---|
| f (mm) | 2.71 |
| Fno | 2.40 |
| FOV (deg.) | 77.0 |
| R1/R2 | 0.31 |
| R3/R4 | 0.05 |
| T12/T45 | 0.40 |
| (Td × f) + (BFL × f) (mm$^2$) | 8.45 |
| TTL (mm) | 3.12 |
| f/f2 | −0.31 |
| f/f3 | 0.09 |
| f/f4 | 1.40 |
| TTL/ImgH | 1.42 |

3rd Embodiment

Figure 5:
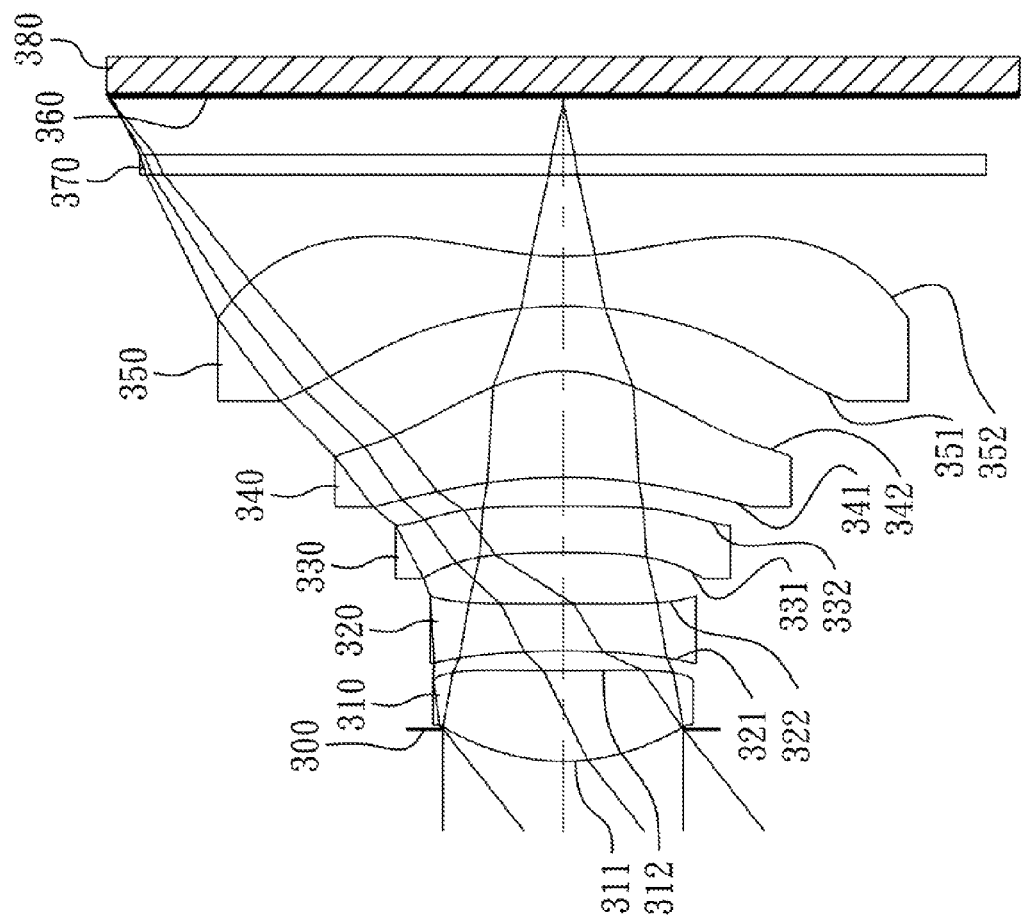
FIG. 5 is a schematic view of an image capturing optical system according to the 3rd embodiment of the present disclosure.
Figure 6:
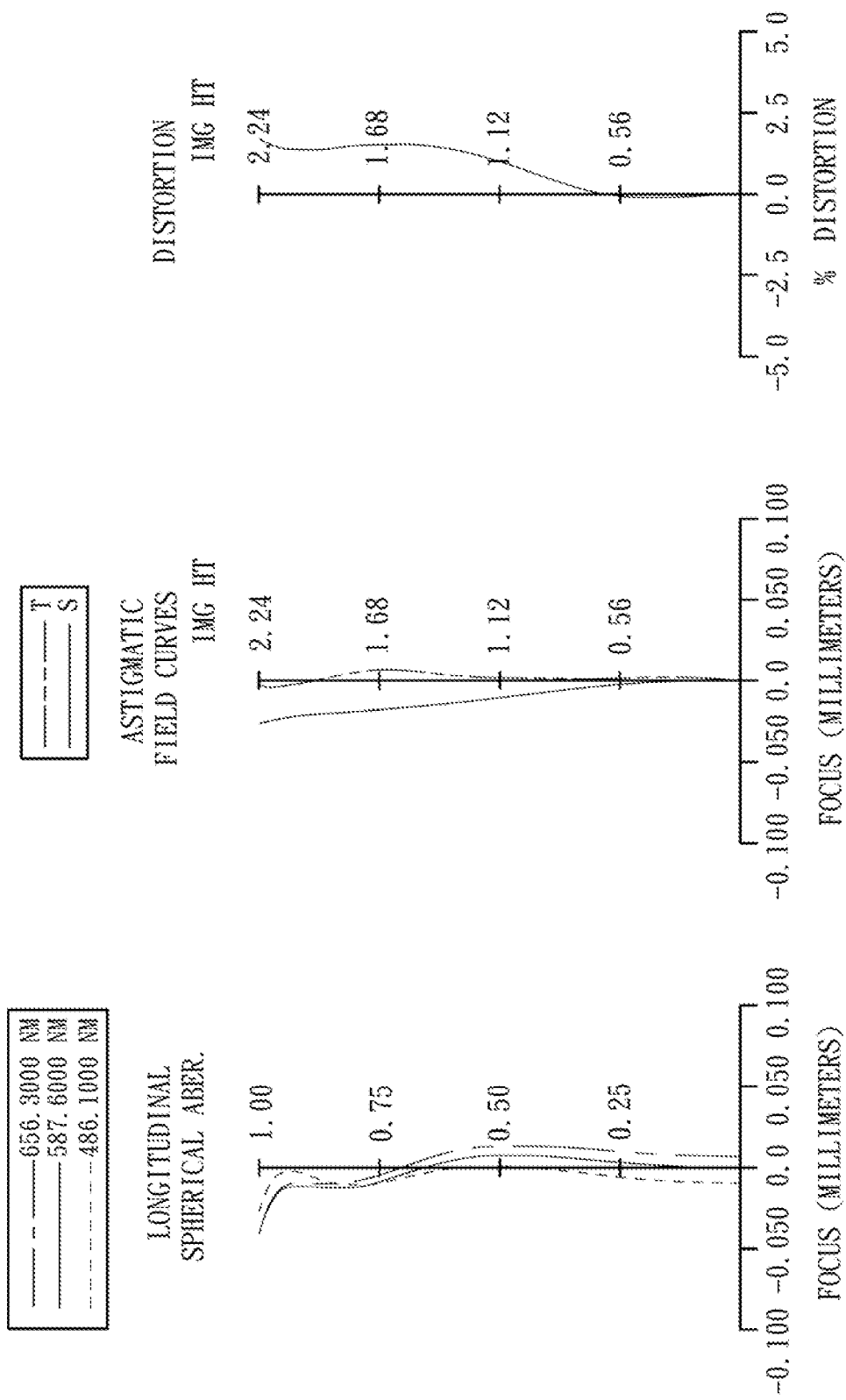
FIG. 6 shows spherical aberration curves, astigmatic field curves and a distortion curve of the image capturing optical system according to the 3rd embodiment.

FIG. 5 is a schematic view of an image capturing optical system according to the 3rd embodiment of the present disclosure. FIG. 6 shows spherical aberration curves, astigmatic field curves and a distortion curve of the image capturing optical system according to the 3rd embodiment. In FIG. 5, the image capturing optical system includes, in order from an object side to an image side, an aperture stop 300, the first lens element 310, the second lens element 320, the third lens element 330, the fourth lens element 340, the fifth lens element 350, an IR-cut filter 370, an image plane 360 and an image sensor 380.

The first lens element 310 with positive refractive power has a convex object-side surface 311 and a concave image-side surface 312, and is made of plastic material. The object-side surface 311 and the image-side surface 312 of the first lens element 310 are aspheric.

The second lens element 320 with negative refractive power has a concave object-side surface 321 and a convex image-side surface 322, and is made of plastic material. The object-side surface 321 and the image-side surface 322 of the second lens element 320 are aspheric. Furthermore, the second lens element 320 has inflection points formed on the image-side surface 322 thereof.

The third lens element 330 with negative refractive power has a concave object-side surface 331 and a convex image-side surface 332, and is made of plastic material. The object-side surface 331 and the image-side surface 332 of the third lens element 330 are aspheric.

The fourth lens element 340 with positive refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a concave image-side surface 352, and is made of plastic material. The object-side surface 351 and the image-side surface 352 of the fifth lens element 350 are aspheric. Furthermore, the fifth lens element 350 has inflection points formed on the image-side surface 352 thereof.

The IR-cut filter 370 is made of glass, and located between the fifth lens element 350 and the image plane 360, and will not affect the focal length of the image capturing optical system.

The detailed optical data of the 3rd embodiment are shown in Table 5 and the aspheric surface data are shown in Table 6 below.

TABLE 5

3rd Embodiment
f = 2.77 mm, Fno = 2.35, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.158 | | | | |
| 2 | Lens 1 | 1.077380 (ASP) | 0.442 | Plastic | 1.544 | 55.9 | 2.10 |
| 3 | | 15.982800 (ASP) | 0.101 | | | | |
| 4 | Lens 2 | −3.560600 (ASP) | 0.230 | Plastic | 1.650 | 21.4 | −6.30 |
| 5 | | −27.933000 (ASP) | 0.250 | | | | |
| 6 | Lens 3 | −7.926500 (ASP) | 0.230 | Plastic | 1.650 | 21.4 | −13.26 |
| 7 | | −100.000000 (ASP) | 0.141 | | | | |
| 8 | Lens 4 | −2.651460 (ASP) | 0.522 | Plastic | 1.544 | 55.9 | 1.63 |
| 9 | | −0.709480 (ASP) | 0.319 | | | | |
| 10 | Lens 5 | −1.621470 (ASP) | 0.245 | Plastic | 1.544 | 55.9 | −1.35 |
| 11 | | 1.411680 (ASP) | 0.400 | | | | |
| 12 | IR-cut filter | Plano | 0.100 | Glass | 1.517 | 64.2 | — |
| 13 | | Plano | 0.290 | | | | |
| 14 | Image | Plano | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −4.69208E+00 | −100000E+00 | −1.50222E+01 | −1.00000E+00 | −2.00000E+01 |
| A4 = | 4.56764E−01 | −7.82161E−02 | 5.30573E−02 | 1.95228E−01 | −4.47410E−01 |
| A6 = | −5.68426E−01 | −2.20139E−01 | −1.76272E−01 | 5.88627E−02 | −2.30066E−01 |
| A8 = | 1.23795E+00 | −9.65446E−01 | −7.35678E−02 | 2.62452E−01 | 1.28868E+00 |
| A10 = | −2.07427E+00 | 9.84195E−01 | −2.88914E+00 | −1.34189E+00 | −1.88571E+00 |
| A12 = | −5.19251E−01 | −3.04364E+00 | 7.91997E+00 | 2.84703E+00 | 3.66405E−01 |
| A14 = | −3.31404E−01 | 2.22908E+00 | −4.23425E+00 | 5.61982E−01 | 1.91604E−07 |

| Surface # | 7 | 8 | 9 | 10 | 11 |
|---|---|---|---|---|---|
| k = | −2.00000E+01 | 2.67633E+00 | −3.28653E+00 | −1.69851E+01 | −1.46671E+01 |
| A4 = | −3.28065E−01 | 3.66867E−02 | −1.89855E−01 | −1.08831E−01 | −1.20611E−01 |
| A6 = | −1.36777E−01 | 1.62646E−01 | 4.73588E−01 | −2.92406E−02 | 4.46436E−02 |
| A8 = | 4.88111E−01 | −8.04054E−01 | −4.36591E−01 | 4.63778E−02 | −2.05937E−02 |
| A10 = | −2.75357E−01 | 1.52080E+00 | 3.07606E−01 | −4.40746E−03 | 6.60271E−03 |
| A12 = | 4.42292E−01 | −1.09697E+00 | −1.25961E−01 | −2.12336E−03 | −1.60315E−03 |
| A14 = | −6.03196E−02 | 2.30043E−01 | 1.02164E−02 | −5.37276E−05 | 1.67948E−04 |

In the optical image lens system according to the 3rd embodiment, the definitions of f, Fno, FOV, R1, R2, R3, R4, T12, T45, Td, BFL, TTL, f2, f3, f4 and ImgH are the same as those stated in the 1st embodiment with corresponding values for the 3rd embodiment. Moreover, these parameters can be calculated from Table 5 and Table 6 as the following values and satisfy the following relationships:

| | |
|---|---|
| f (mm) | 2.77 |
| Fno | 2.35 |
| FOV (deg.) | 77.0 |
| R1/R2 | 0.07 |
| R3/R4 | 0.13 |
| T12/T45 | 0.32 |
| (Td × f) + (BFL × f) (mm$^2$) | 8.98 |
| TTL (mm) | 3.24 |
| f/f2 | −0.44 |
| f/f3 | −0.21 |
| f/f4 | 1.71 |
| TTL/ImgH | 1.45 |

4th Embodiment

Figure 7:
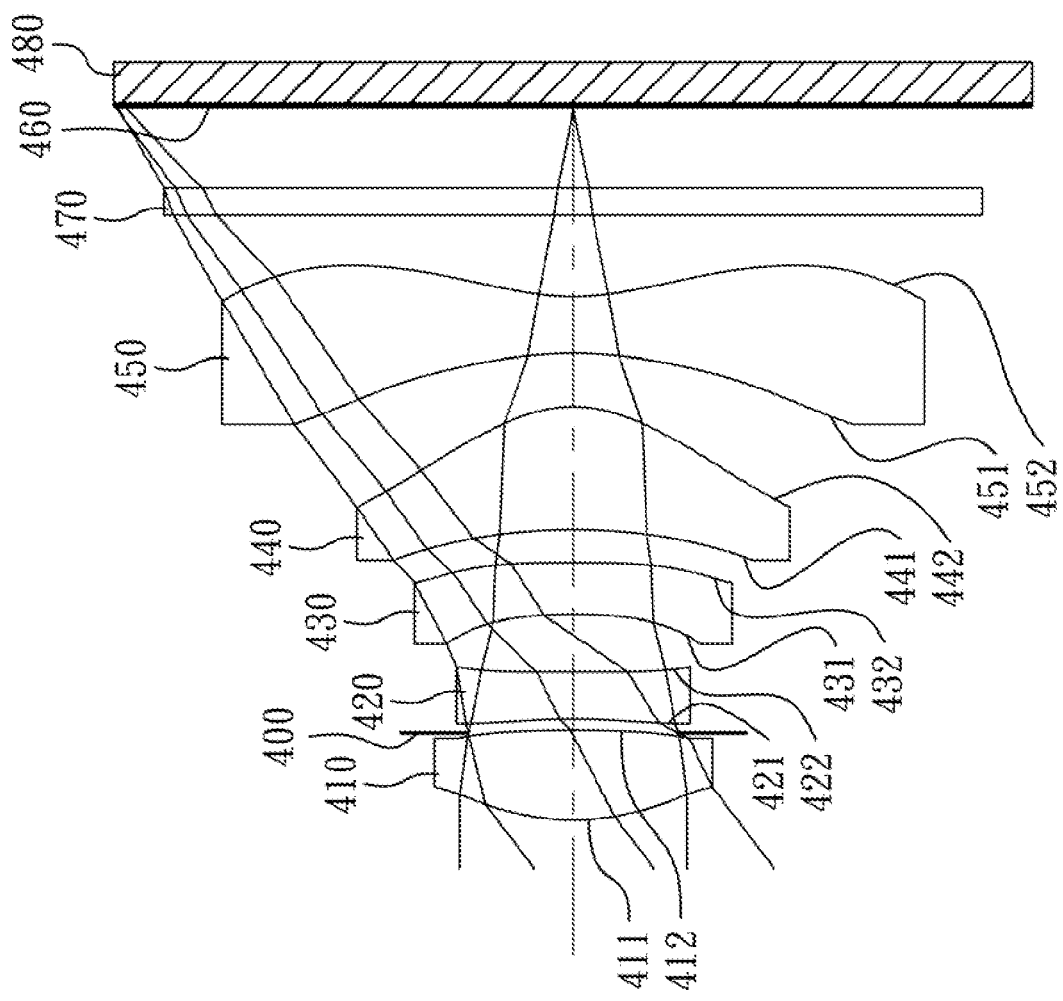
FIG. 7 is a schematic view of an image capturing optical system according to the 4th embodiment of the present disclosure.
Figure 8:
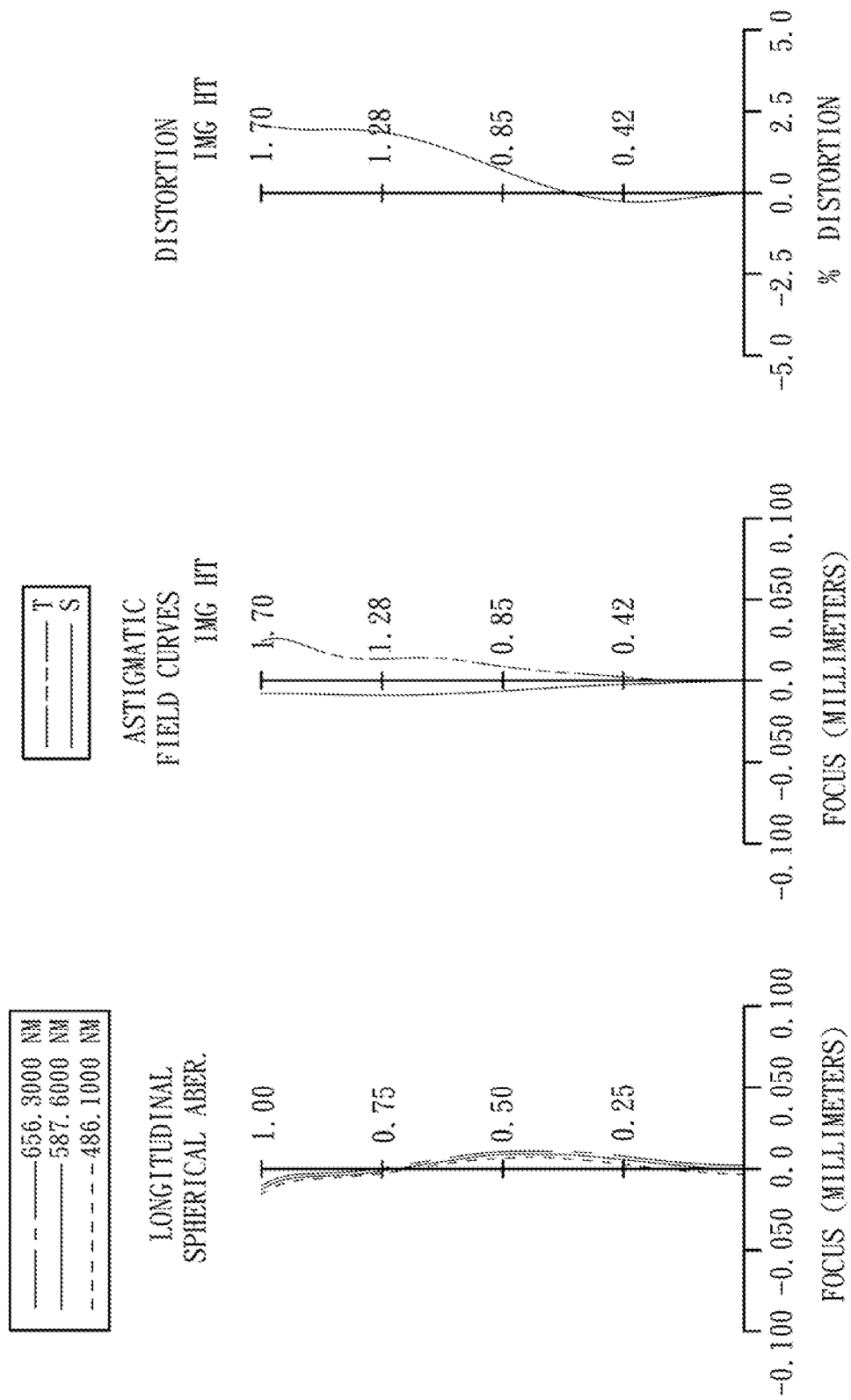
FIG. 8 shows spherical aberration curves, astigmatic field curves and a distortion curve of the image capturing optical system according to the 4th embodiment.

FIG. 7 is a schematic view of an image capturing optical system according to the 4th embodiment of the present disclosure. FIG. 8 shows spherical aberration curves, astigmatic field curves and a distortion curve of the image capturing optical system according to the 4th embodiment. In FIG. 7, the image capturing optical system includes, in order from an object side to an image side, the first lens element 410, an aperture stop 400, the second lens element 420, the third lens element 430, the fourth lens element 440, the fifth lens element 450, an IR-cut filter 470, an image plane 460 and an image sensor 480.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a concave object-side surface 421 and a convex image-side surface 422, and is made of plastic material. The object-side surface 421 and the image-side surface 422 of the second lens element 420 are aspheric. Furthermore, the second lens element 420 has inflection points formed on the image-side surface 422 thereof.

The third lens element 430 with negative refractive power has a concave object-side surface 431 and a convex image-side surface 432, and is made of plastic material. The object-side surface 431 and the image-side surface 432 of the third lens element 430 are aspheric.

The fourth lens element 440 with positive refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a concave object-side surface 451 and a concave image-side surface 452, and is made of plastic material. The object-side surface 451 and the image-side surface 452 of the fifth lens element 450 are aspheric. Furthermore, the fifth lens element 450 has inflection points formed on the image-side surface 452 thereof.

The IR-cut filter 470 is made of glass, and located between the fifth lens element 450 and the image plane 460, and will not affect the focal length of the image capturing optical system.

The detailed optical data of the 4th embodiment are shown in Table 7 and the aspheric surface data are shown in Table 8 below.

TABLE 7

4th Embodiment
f = 2.19 mm, Fno = 2.60, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.902328 (ASP) | 0.330 | Plastic | 1.544 | 55.9 | 1.45 |
| 2 | | −5.341400 (ASP) | −0.010 | | | | |
| 3 | Ape. Stop | Plano | 0.051 | | | | |
| 4 | Lens 2 | −2.482729 (ASP) | 0.178 | Plastic | 1.640 | 23.3 | −4.13 |
| 5 | | −43.059786 (ASP) | 0.210 | | | | |
| 6 | Lens 3 | −2.285083 (ASP) | 0.194 | Plastic | 1.640 | 23.3 | −5.04 |
| 7 | | −8.120171 (ASP) | 0.122 | | | | |
| 8 | Lens 4 | −2.091947 (ASP) | 0.455 | Plastic | 1.535 | 56.3 | 1.07 |
| 9 | | −0.481529 (ASP) | 0.198 | | | | |
| 10 | Lens 5 | −1.367431 (ASP) | 0.210 | Plastic | 1.535 | 56.3 | −0.95 |
| 11 | | 0.849174 (ASP) | 0.300 | | | | |
| 12 | IR-cut filter | Plano | 0.100 | Glass | 1.517 | 64.2 | — |
| 13 | | Plano | 0.309 | | | | |
| 14 | Image | Plano | — | | | | |

Note:
Reference wavelength (d-line) is 587.6 nm.

TABLE 8

Aspheric Coefficients

| Surface # | 1 | 2 | 4 | 5 | 6 |
|---|---|---|---|---|---|
| k = | −5.89765E+00 | −4.24732E+00 | −4.17253E+01 | −5.00000E+01 | −1.00000E+00 |
| A4 = | 8.28802E−01 | −2.37337E−01 | 2.05446E−01 | 5.67085E−01 | −1.12544E+00 |
| A6 = | −2.06925E+00 | −4.46253E−01 | 1.45391E+00 | 5.85690E−02 | −1.00576E+00 |
| A8 = | 8.53854E−01 | −2.52058E+00 | −3.46751E+00 | 1.03857E+00 | 5.09222E+00 |

TABLE 8-continued

Aspheric Coefficients

| A10 = | −5.93975E+00 | 6.59751E+00 | −4.84995E+00 | −1.03225E+01 | −1.07257E+01 |
|---|---|---|---|---|---|
| A12 = | −2.47996E+01 | −2.74755E+01 | 9.14297E+01 | 3.08164E+01 | 3.24352E+00 |
| A14 = | 1.58054E+01 | 3.47650E+01 | −6.60375E+01 | 8.76484E+00 | −1.77957E+01 |

| Surface # | 7 | 8 | 9 | 10 | 11 |
|---|---|---|---|---|---|
| k = | −1.00000E+00 | 3.68932E+00 | −3.02326E+00 | −2.38892E+01 | −1.14655E+01 |
| A4 = | −6.65942E−01 | 3.08723E−02 | −4.52865E−01 | −1.35613E−01 | −2.24319E−01 |
| A6 = | −4.57460E−01 | 4.76861E−01 | 1.40491E+00 | −1.00585E−01 | 1.64690E−01 |
| A8 = | 2.40547E+00 | −3.52602E+00 | −1.80218E+00 | 1.99674E−01 | −1.16211E−01 |
| A10 = | −7.90028E−01 | 1.02960E+01 | 2.06271E+00 | −3.43951E−02 | 4.85854E−02 |
| A12 = | 7.56914E+00 | −1.12056E+01 | −1.44895E+00 | −2.61751E−02 | −1.27042E−02 |
| A14 = | −9.32111E−01 | 1.93348E+00 | −4.50982E−02 | 3.86614E−03 | 1.87772E−03 |

In the optical image lens system according to the 4th embodiment, the definitions of f, Fno, FOV, R1, R2, R3, R4, T12, T45, Td, BFL, TTL, f2, f3, f4 and ImgH are the same as those stated in the 1st embodiment with corresponding values for the 4th embodiment. Moreover, these parameters can be calculated from Table 7 and Table 8 as the following values and satisfy the following relationships:

| f (mm) | 2.19 |
|---|---|
| Fno | 2.60 |
| FOV (deg.) | 74.6 |
| R1/R2 | −0.17 |
| R3/R4 | 0.06 |
| T12/T45 | 0.20 |
| (Td × f) + (BFL × f) (mm$^2$) | 5.72 |
| TTL (mm) | 2.61 |
| f/f2 | −0.53 |
| f/f3 | −0.43 |
| f/f4 | 2.05 |
| TTL/ImgH | 1.54 |

5th Embodiment

Figure 9:
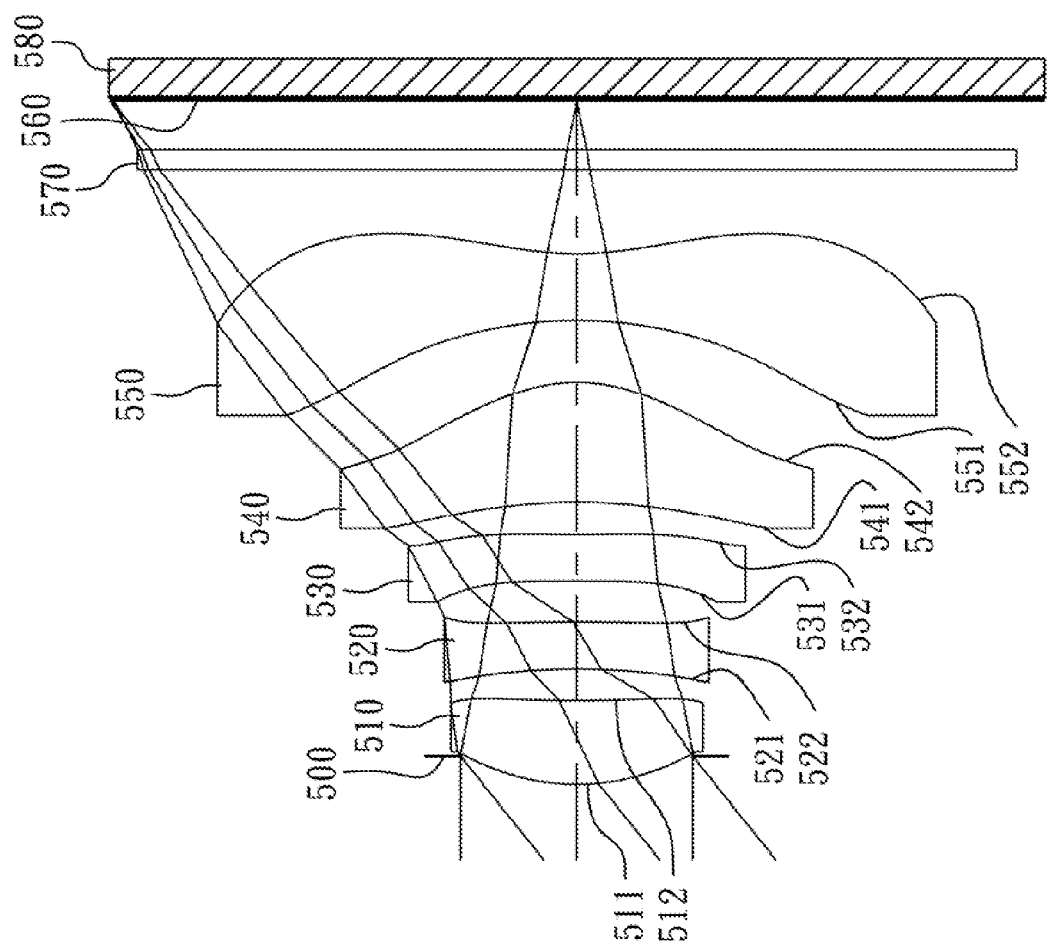
FIG. 9 is a schematic view of an image capturing optical system according to the 5th embodiment of the present disclosure.
Figure 10:
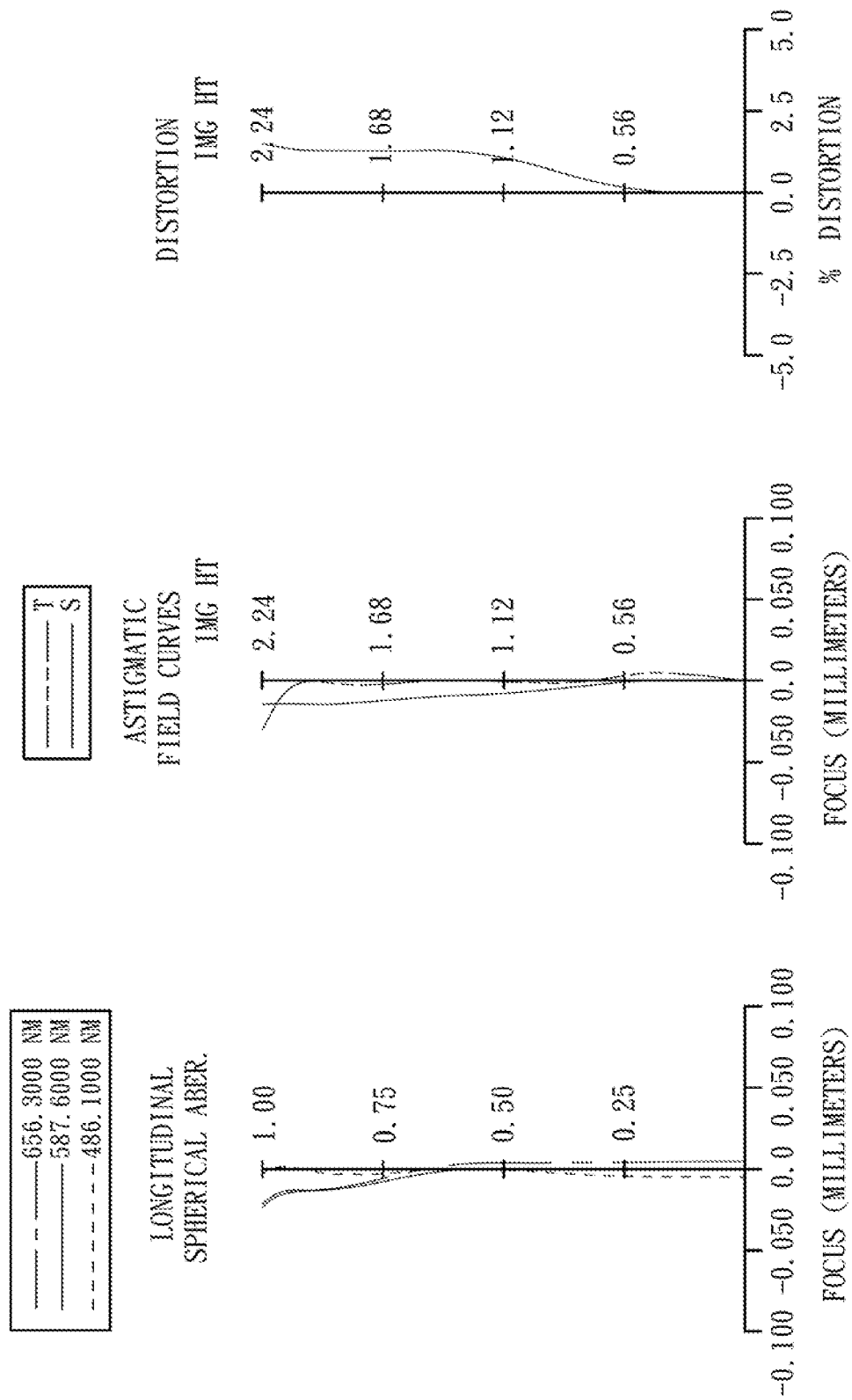
FIG. 10 shows spherical aberration curves, astigmatic field curves and a distortion curve of the image capturing optical system according to the 5th embodiment.

FIG. 9 is a schematic view of an image capturing optical system according to the 5th embodiment of the present disclosure. FIG. 10 shows spherical aberration curves, astigmatic field curves and a distortion curve of the image capturing optical system according to the 5th embodiment. In FIG. 9, the image capturing optical system includes, in order from an object side to an image side, an aperture stop 500, the first lens element 510, the second lens element 520, the third lens element 530, the fourth lens element 540, the fifth lens element 550, an IR-cut filter 570, an image plane 560 and an image sensor 580.

The first lens element 510 with positive refractive power has a convex object-side surface 511 and a concave image-side surface 512, and is made of glass material. The object-side surface 511 and the image-side surface 512 of the first lens element 510 are aspheric.

The second lens element 520 with negative refractive power has a concave object-side surface 521 and a convex image-side surface 522, and is made of plastic material. The object-side surface 521 and the image-side surface 522 of the second lens element 520 are aspheric. Furthermore, the second lens element 520 has inflection points formed on the image-side surface 522 thereof.

The third lens element 530 with negative refractive power has a concave object-side surface 531 and a concave image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a concave object-side surface 551 and a concave image-side surface 552, and is made of plastic material. The object-side surface 551 and the image-side surface 552 of the fifth lens element 550 are aspheric. Furthermore, the fifth lens element 550 has inflection points formed on the image-side surface 552 thereof.

The IR-cut filter 570 is made of glass, and located between the fifth lens element 550 and the image plane 560, and will not affect the focal, length of the image capturing optical system.

The detailed optical data of the 5th embodiment are shown in Table 9 and the aspheric surface data are shown in Table 10 below.

TABLE 9

5th Embodiment
f = 2.78 mm, Fno = 2.50, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.135 | | | | |
| 2 | Lens 1 | 1.090030 (ASP) | 0.402 | Glass | 1.592 | 68.4 | 2.18 |
| 3 | | 6.098600 (ASP) | 0.148 | | | | |
| 4 | Lens 2 | −3.069700 (ASP) | 0.229 | Plastic | 1.650 | 21.4 | −8.63 |
| 5 | | −6.981400 (ASP) | 0.196 | | | | |
| 6 | Lens 3 | −26.182800 (ASP) | 0.220 | Plastic | 1.650 | 21.4 | −11.95 |
| 7 | | 11.079100 (ASP) | 0.157 | | | | |
| 8 | Lens 4 | −2.763890 (ASP) | 0.575 | Plastic | 1.544 | 55.9 | 1.79 |
| 9 | | −0.771580 (ASP) | 0.297 | | | | |

TABLE 9-continued

5th Embodiment
f = 2.78 mm, Fno = 2.50, HFOV = 38.5 deg.

| Surface # |  | Curvature Radius | Thickness | Material | Index | Abbe # | Focal length |
|---|---|---|---|---|---|---|---|
| 10 | Lens 5 | −1.959530 (ASP) | 0.319 | Plastic | 1.544 | 55.9 | −1.46 |
| 11 |  | 1.420090 (ASP) | 0.400 |  |  |  |  |
| 12 | IR-cut filter | Plano | 0.100 | Glass | 1.517 | 64.2 | — |
| 13 |  | Plano | 0.246 |  |  |  |  |
| 14 | Image | Plano | — |  |  |  |  |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −4.67973E+00 | −2.97689E+00 | −1.15880E+01 | −1.00000E+00 | −2.00000E+01 |
| A4 = | 4.49696E−01 | −9.12473E−02 | 4.56800E−02 | 2.01468E−01 | −4.44756E−01 |
| A6 = | −5.98649E−01 | −2.42864E−01 | −1.80708E−01 | 1.02786E−01 | −2.67851E−01 |
| A8 = | 1.18539E+00 | −1.07963E+00 | 3.34850E−03 | 2.66699E−01 | 1.26260E+00 |
| A10 = | −2.16258E+00 | 1.21213E+00 | −2.51159E+00 | −8.79799E−01 | −1.79579E+00 |
| A12 = | −5.10714E−01 | −3.04177E+00 | 7.92586E+00 | 2.85742E+00 | 2.39354E−01 |
| A14 = | −3.31404E−01 | 2.22908E+00 | −4.23425E+00 | 5.61982E−01 | −1.78565E−02 |

| Surface # | 7 | 8 | 9 | 10 | 11 |
|---|---|---|---|---|---|
| k = | −2.00000E+01 | 2.72635E+00 | −3.57182E+00 | −1.22383E+01 | −1.51834E+01 |
| A4 = | −3.23311E−01 | 3.50063E−02 | −2.14783E−01 | −1.04750E−01 | −1.17235E−01 |
| A6 = | −1.19609E−01 | 1.65837E−01 | 4.67673E−01 | −2.85636E−02 | 4.20254E−02 |
| A8 = | 5.06580E−01 | −8.04301E−01 | −4.36270E−01 | 4.62428E−02 | −2.05621E−02 |
| A10 = | −2.61507E−01 | 1.52063E+00 | 3.09587E−01 | −4.35087E−03 | 6.85791E−03 |
| A12 = | 4.31933E−01 | −1.09242E+00 | −1.23383E−01 | −2.08971E−03 | −1.51928E−03 |
| A14 = | −1.30919E−01 | 2.40971E−01 | 1.23710E−02 | −4.60231E−05 | 1.40055E−04 |

In the optical image lens system according to the 5th embodiment, the definitions of f, Fno, FOV, R1, R2, R3, R4, T12, T45, Td, BFL, TTL, f2, f3, f4 and ImgH are the same as those stated in the 1st embodiment with corresponding values for the 5th embodiment. Moreover, these parameters can be calculated from Table 9 and Table 10 as the following values and satisfy the following relationships:

| f (mm) | 2.78 |
|---|---|
| Fno | 2.50 |
| FOV (deg.) | 77.0 |
| R1/R2 | 0.18 |
| R3/R4 | 0.44 |
| T12/T45 | 0.50 |
| (Td × f) + (BFL × f) (mm²) | 9.05 |
| TTL (mm) | 3.26 |
| f/f2 | −0.32 |
| f/f3 | −0.23 |
| f/f4 | 1.56 |
| TTL/ImgH | 1.45 |

6th Embodiment

Figure 11:
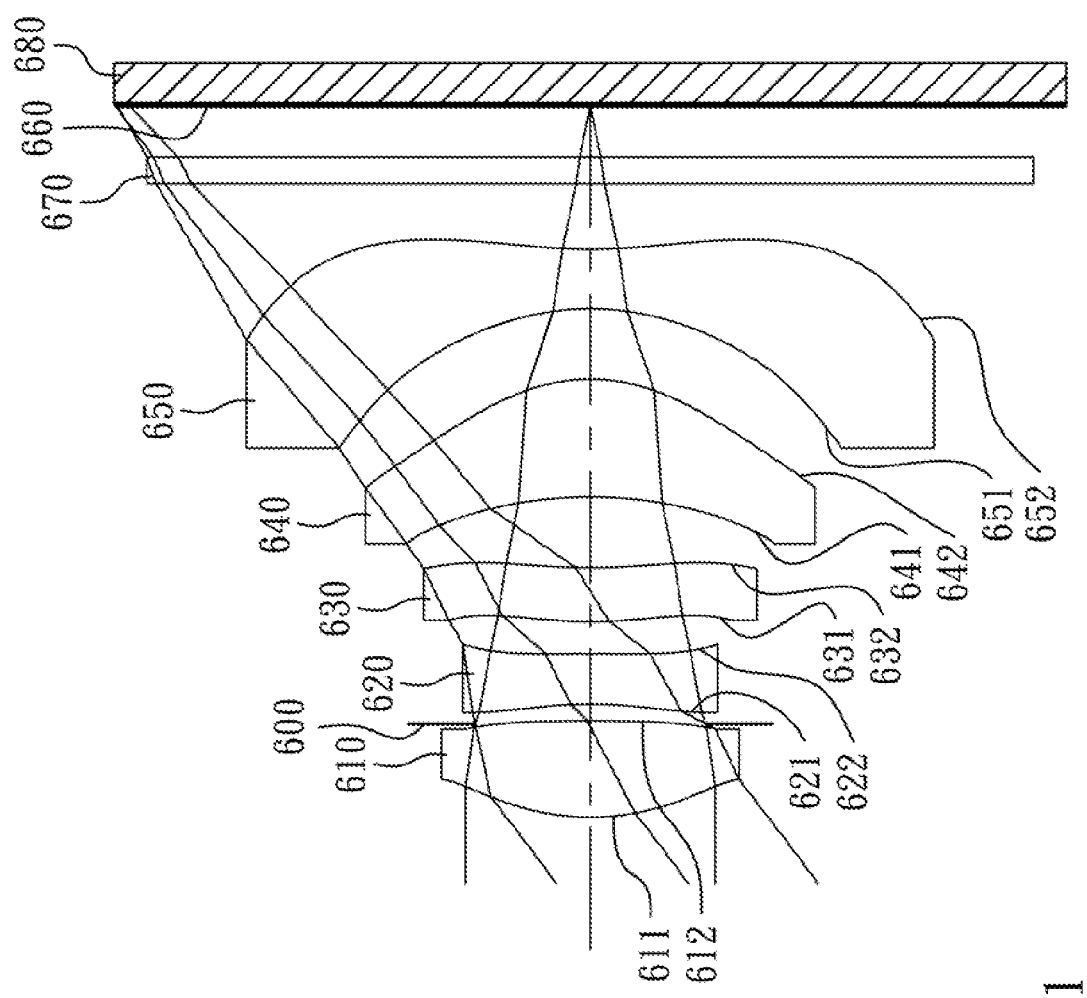
FIG. 11 is a schematic view of an image capturing optical system according to the 6th embodiment of the present disclosure.
Figure 12:
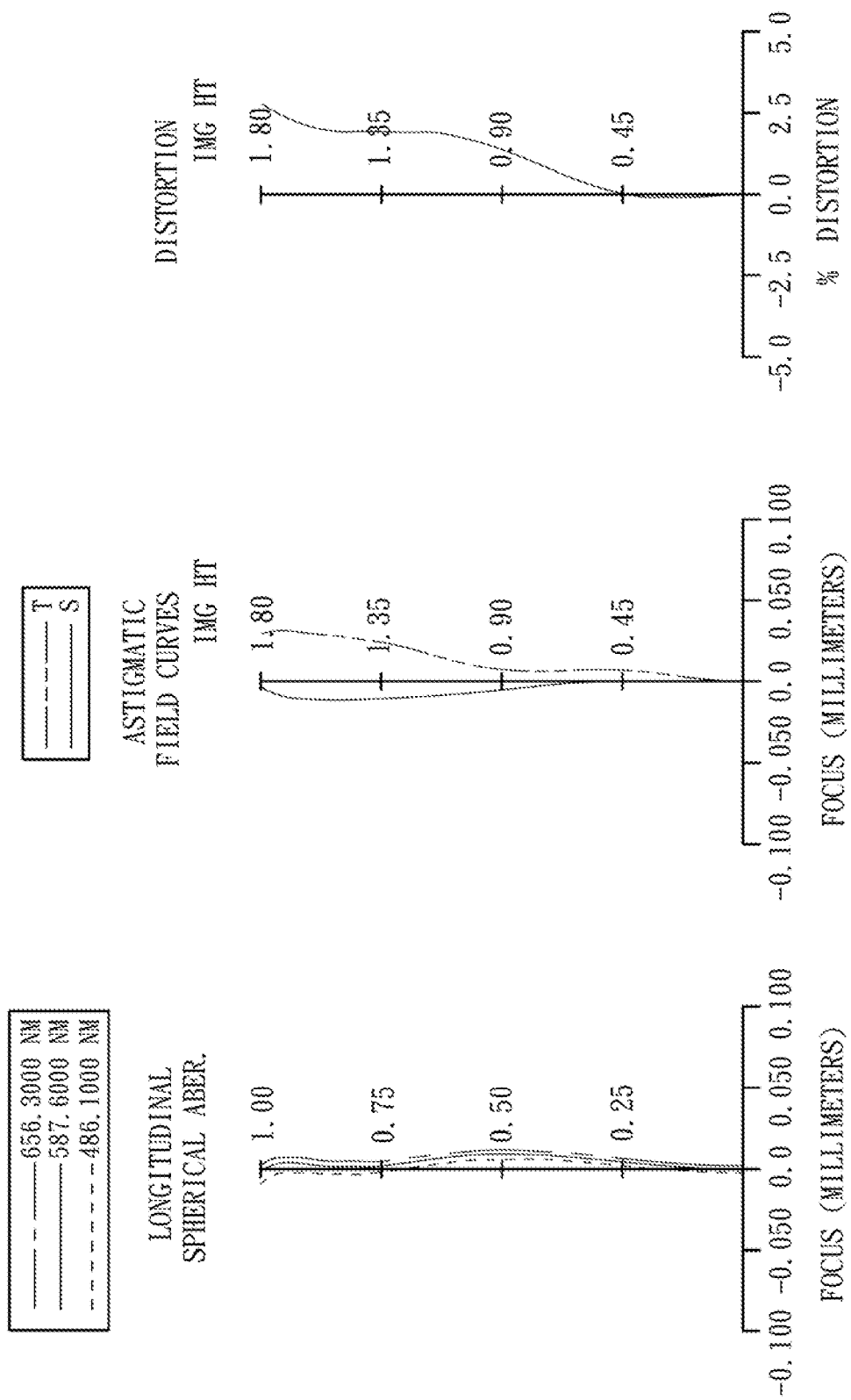
FIG. 12 shows spherical aberration curves, astigmatic field curves and a distortion curve of the image capturing optical system according to the 6th embodiment.

FIG. 11 is a schematic view of an image capturing optical system according to the 6th embodiment of the present disclosure. FIG. 12 shows spherical aberration curves, astigmatic field curves and a distortion curve of the image capturing optical system according to the 6th embodiment. In FIG. 11, the image capturing optical system includes, in order from an object side to an image side, the first lens element 610, an aperture stop 600, the second lens element 620, the third lens element 630, the fourth lens element 640, the fifth lens element 650, an IR-cut filter 670, an image plane 660 and an image sensor 680.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a convex image-side surface 622, and is made of plastic material. The object-side surface 621 and the image-side surface 622 of the second lens element 620 are aspheric. Furthermore, the second lens element 620 has inflection points formed on the image-side surface 622 thereof.

The third lens element 630 with positive refractive power has a convex object-side surface 631 and a concave image-side surface 632, and is made of plastic material. The object-side surface 631 and the image-side surface 632 of the third lens element 630 are aspheric.

The fourth lens element 640 with positive refractive power has a concave object-side surface 641 and a convex image-side surface 642, and is made of plastic material. The object-side surface 641 and the image-side surface 542 of the fourth lens element 640 are aspheric.

The fifth lens element 650 with negative refractive power has a concave object-side surface 651 and a concave image-side surface 652, and is made of plastic material. The object-side surface 651 and the image-side surface 652 of the fifth lens element 650 are aspheric. Furthermore, the fifth lens element 650 has inflection points formed on the image-side surface 652 thereof.

The IR-cut filter 670 is made of glass, and located between the fifth lens element 650 and the image plane 660, and will not affect the focal, length of the image capturing optical system.

The detailed optical data of the 6th embodiment are shown in Table 11 and the aspheric surface data are shown in Table 12 below

TABLE 11

6th Embodiment
f = 2.31 mm, Fno = 2.45, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.922997 (ASP) | 0.365 | Plastic | 1.544 | 55.9 | 1.49 |
| 2 | | −5.810657 (ASP) | −0.012 | | | | |
| 3 | Ape. Stop | Plano | 0.074 | | | | |
| 4 | Lens 2 | −1.526391 (ASP) | 0.189 | Plastic | 1.640 | 23.3 | −2.50 |
| 5 | | −35.863714 (ASP) | 0.123 | | | | |
| 6 | Lens 3 | 1.640211 (ASP) | 0.206 | Plastic | 1.544 | 55.9 | 8.47 |
| 7 | | 2.433874 (ASP) | 0.265 | | | | |
| 8 | Lens 4 | −1.648303 (ASP) | 0.447 | Plastic | 1.544 | 55.9 | 1.63 |
| 9 | | −0.631354 (ASP) | 0.268 | | | | |
| 10 | Lens 5 | −0.962606 (ASP) | 0.223 | Plastic | 1.544 | 55.9 | −1.13 |
| 11 | | 1.825646 (ASP) | 0.250 | | | | |
| 12 | IR-cut filter | Plano | 0.100 | Glass | 1.517 | 64.2 | — |
| 13 | | Plano | 0.198 | | | | |
| 14 | Image | Plano | — | | | | |

Note:
Reference wavelength (d-line) is 587.6 nm.

TABLE 12

Aspheric Coefficients

| Surface # | 1 | 2 | 4 | 5 | 6 |
|---|---|---|---|---|---|
| k = | −5.32379E+00 | −5.00000E+01 | −2.24876E+01 | −5.00000E+01 | −2.27818E+00 |
| A4 = | 7.15433E−01 | −7.77584E−02 | 2.58230E−01 | 5.75214E−01 | −9.77036E−01 |
| A6 = | −1.52508E+00 | −4.48204E−01 | 1.71026E+00 | 8.03187E−01 | 6.11452E−02 |
| A8 = | 1.28724E+00 | −2.99897E+00 | −6.63027E+00 | −1.03658E+00 | 1.09427E+00 |
| A10 = | −4.17695E+00 | 7.21414E+00 | 2.31563E+00 | −2.17338E+00 | −4.42285E+00 |
| A12 = | −1.32247E+01 | −1.46516E+01 | 4.87561E+01 | 1.64333E+01 | 1.72965E+00 |
| A14 = | 7.51800E+00 | 1.65363E+01 | −3.14111E+01 | 4.16906E+00 | −8.46458E+00 |

| Surface # | 7 | 8 | 9 | 10 | 11 |
|---|---|---|---|---|---|
| k = | −1.00000E+00 | 4.01294E+00 | −3.26867E+00 | −5.67756E+00 | −4.16639E+01 |
| A4 = | −4.99005E−01 | 1.56732E−02 | −4.53135E−01 | −3.05516E−01 | −2.00179E−01 |
| A6 = | −5.67055E−01 | 7.77875E−01 | 9.21776E−01 | −3.55941E−02 | 8.81118E−02 |
| A8 = | 1.07027E+00 | −2.56143E+00 | −1.14287E+00 | 1.58903E−01 | −7.03322E−02 |
| A10 = | −1.09107E+00 | 5.33334E+00 | 1.40492E+00 | −1.76595E−01 | 2.36231E−02 |
| A12 = | 3.39896E+00 | −5.64747E+00 | −7.54039E−01 | −7.21212E−02 | −6.56404E−03 |
| A14 = | −4.43360E−01 | 4.17734E+00 | −2.80816E−01 | 1.37000E−01 | 1.06130E−03 |

In the optical image lens system according to the 6th embodiment, the definitions of f, Fno, FOV, R1, R2, R3, R4, T12, T45, Td, BFL, TTL, f2, f3, f4 and ImgH are the same as those stated in the 1st embodiment with corresponding values for the 6th embodiment. Moreover, these parameters can be calculated from Table 11 and Table 12 as the following values and satisfy the following relationships:

| | |
|---|---|
| f (mm) | 2.31 |
| Fno | 2.45 |
| FOV (deg.) | 74.2 |
| R1/R2 | −0.16 |
| R3/R4 | 0.04 |
| T12/T45 | 0.23 |
| (Td × f) + (BFL × f) (mm²) | 6.15 |
| TTL (mm) | 2.66 |
| f/f2 | −0.93 |
| f/f3 | 0.27 |
| f/f4 | 1.42 |
| TTL/ImgH | 1.48 |

7th Embodiment

Figure 13:
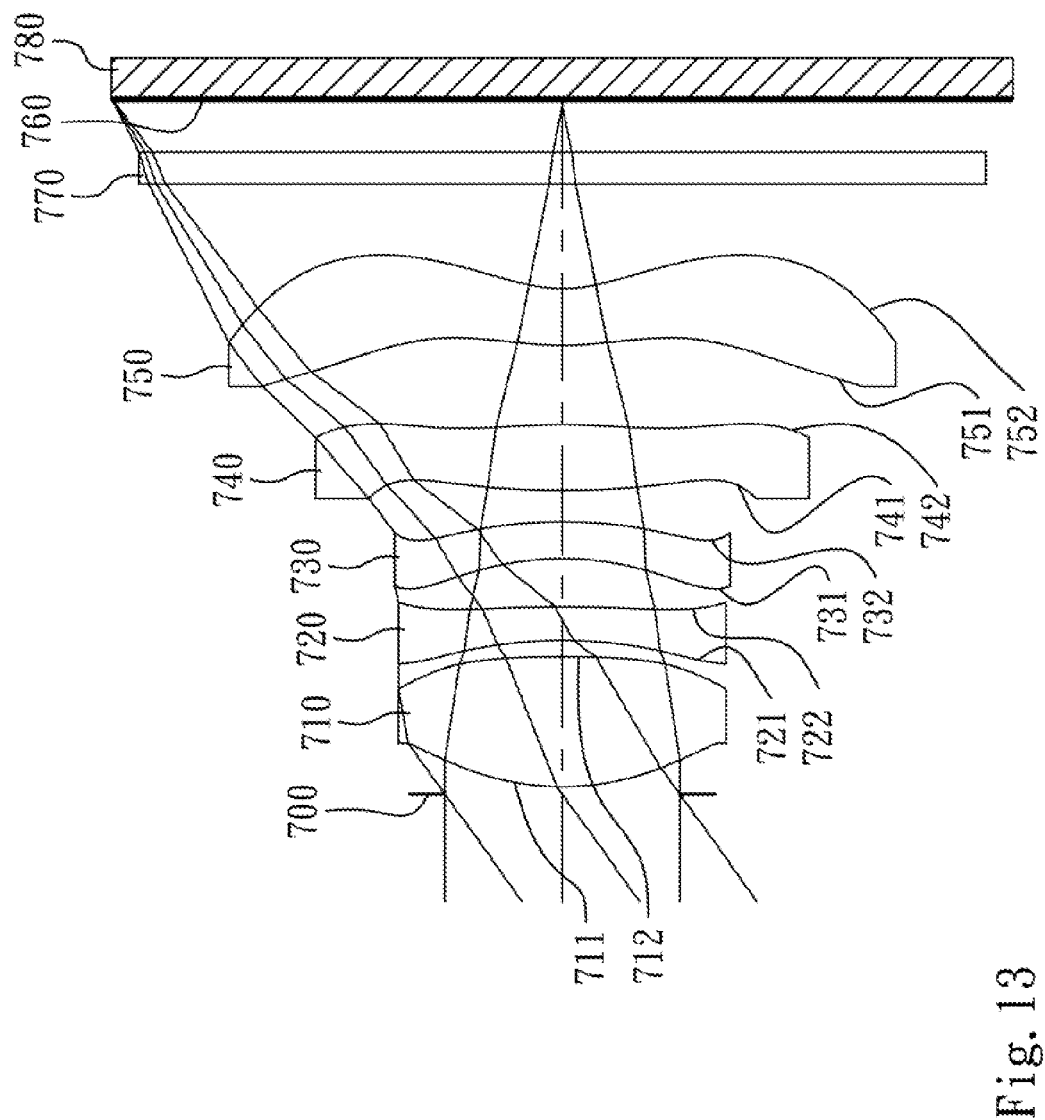
FIG. 13 is a schematic view of an image capturing optical system according to the 7th embodiment of the present disclosure.
Figure 14:
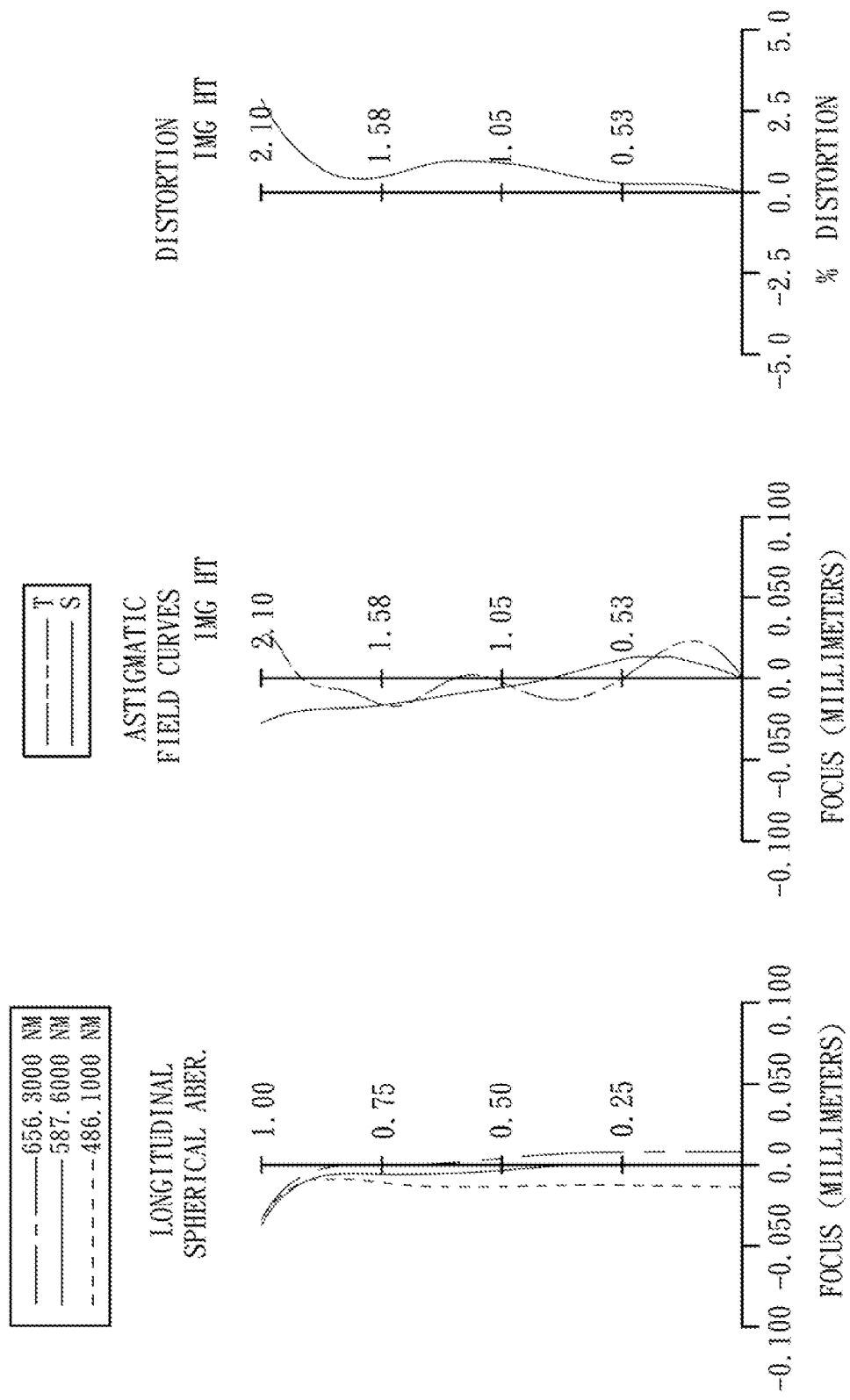
FIG. 14 shows spherical aberration curves, astigmatic field curves and a distortion curve of the image capturing optical system according to the 7th embodiment.

FIG. 13 is a schematic view of an image capturing optical system according to the 7th embodiment of the present disclosure. FIG. 14 shows spherical aberration curves, astigmatic field curves and a distortion curve of the image capturing optical system according to the 7th embodiment. In FIG. 13, the image capturing optical system includes, in order from an object side to an image side, an aperture stop 700, the first lens element 710, the second lens element 720, the third lens element 730, the fourth lens element 740, the fifth lens element 750, an IR-cut filter 770, an image plane 760 and an image sensor 780.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a convex image-side surface 722, and is made of plastic material. The object-side surface 721 and the image-side surface 722 of the second lens element 720 are aspheric. Furthermore, the second lens element 720 has inflection points formed on the image-side surface 722 thereof.

The third lens element 730 with negative refractive power has a concave object-side surface 731 and a convex image-side surface 732, and is made of plastic material. The object-side surface 731 and the image-side surface 732 of the third lens element 730 are aspheric.

The fourth lens element 740 with positive refractive power has a convex object-side surface 741 and a convex image-side surface 742, and is made of plastic material. The object-side surface 741 and the image-side surface 742 of the fourth lens element 740 are aspheric.

The fifth lens element 750 with negative refractive power has a convex object-side surface 751 and a concave image-side surface 752, and is made of plastic material. The object-side surface 751 and the image-side surface 752 of the fifth lens element 750 are aspheric. Furthermore, the fifth lens element 750 has inflection points formed on the object-side surface 751 and the image-side surface 752 thereof.

The IR-cut filter 770 is made of glass, and located between the fifth lens element 750 and the image plane 760, and will not affect the focal length of the image capturing optical system.

The detailed optical data, of the 7th embodiment are shown in Table 13 and the aspheric surface data are shown in Table 14 below.

TABLE 13

7th Embodiment
f = 2.85 mm, Fno = 2.60, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.035 | | | | |
| 2 | Lens 1 | 1.211100 (ASP) | 0.604 | Plastic | 1.544 | 55.9 | 1.93 |
| 3 | | −6.497700 (ASP) | 0.076 | | | | |
| 4 | Lens 2 | −2.240980 (ASP) | 0.160 | Plastic | 1.650 | 21.4 | −5.63 |
| 5 | | −5.940000 (ASP) | 0.225 | | | | |
| 6 | Lens 3 | −1.415660 (ASP) | 0.168 | Plastic | 1.544 | 55.9 | −6.33 |
| 7 | | −2.504880 (ASP) | 0.151 | | | | |
| 8 | Lens 4 | 5.747100 (ASP) | 0.306 | Plastic | 1.544 | 55.9 | 3.43 |
| 9 | | −2.717890 (ASP) | 0.369 | | | | |
| 10 | Lens 5 | 1.216250 (ASP) | 0.263 | Plastic | 1.544 | 55.9 | −2.83 |
| 11 | | 0.628040 (ASP) | 0.490 | | | | |
| 12 | IR-cut filter | Plano | 0.147 | Glass | 1.517 | 64.2 | — |
| 13 | | Plano | 0.250 | | | | |
| 14 | Image | Plano | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | −1.47766E+00 | −4.02775E+01 | 1.00000E+00 | −9.00000E+01 | −1.61053E+00 |
| A4 = | 7.22592E−02 | −2.92563E−01 | −7.51600E−02 | 5.04427E−02 | −1.21739E−01 |
| A6 = | 2.43614E−02 | −1.26228E−01 | 1.41878E−01 | 2.21758E−01 | 1.05190E−01 |
| A8 = | −4.83890E−01 | −1.85000E−01 | 2.40112E−01 | −2.34283E−02 | 9.17450E−01 |

TABLE 14-continued

Aspheric Coefficients

| A10 = | 2.81667E−01 | 5.75392E−01 | | | −3.47781E−01 |
|---|---|---|---|---|---|
| Surface # | 7 | 8 | 9 | 10 | 11 |
| k = | 1.00000E+00 | −9.00000E+01 | −2.44437E+01 | −2.86495E+01 | −6.88697E+00 |
| A4 = | −1.81685E−01 | 4.00059E−01 | 4.52795E−01 | −4.92987E−01 | −3.00141E−01 |
| A6 = | 2.51187E−01 | −1.09268E+00 | −3.64434E−01 | 4.01767E−01 | 2.06573E−01 |
| A8 = | 2.55834E−01 | 1.39040E+00 | −3.81676E−03 | −1.59621E−01 | −1.05375E−01 |
| A10 = | 6.13777E−01 | −1.40769E+00 | −2.03864E−01 | 3.88939E−02 | 2.35738E−02 |
| A12 = | | 4.27138E−01 | 4.55458E−01 | −6.60454E−03 | −8.20237E−04 |
| A14 = | | | −2.75279E−01 | 4.79608E−04 | −2.88419E−04 |
| A16 = | | | 5.19400E−02 | | |

In the optical image lens system according to the 7th embodiment, the definitions of f, Fno, FOV, R1, R2, R3, R4, T12, T45, Td, BFL, TTL, f2, f3, f4 and ImgH are the same as those stated in the 1st embodiment with corresponding values for the 7th embodiment. Moreover, these parameters can be calculated from Table 13 and Table 14 as the following values and satisfy the following relationships:

| | |
|---|---|
| f (mm) | 2.85 |
| Fno | 2.60 |
| FOV (deg.) | 71.4 |
| R1/R2 | −0.19 |
| R3/R4 | 0.38 |
| T12/T45 | 0.21 |
| (Td × f) + (BFL × f) (mm$^2$) | 9.00 |
| TTL (mm) | 3.16 |
| f/f2 | −0.51 |
| f/f3 | −0.45 |
| f/f4 | 0.83 |
| TTL/ImgH | 1.50 |

8th Embodiment

Figure 15:
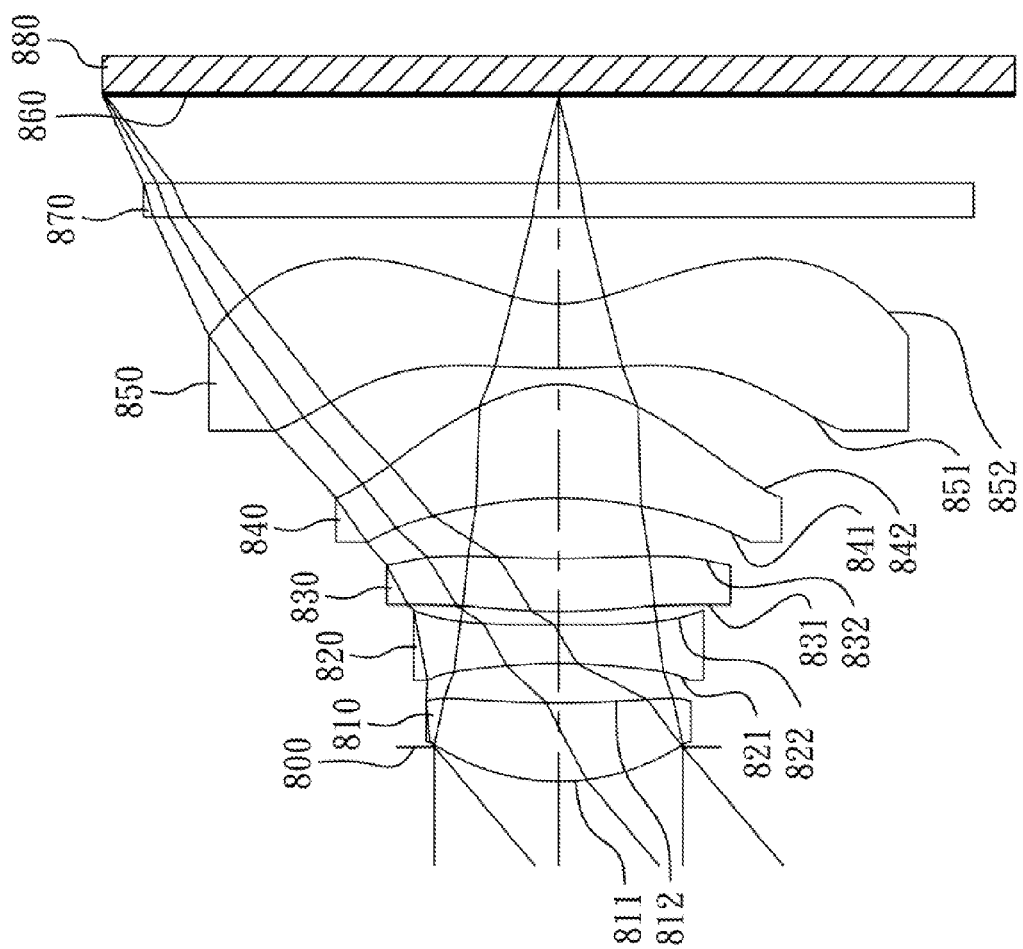
FIG. 15 is a schematic view of an image capturing optical system according to the 8th embodiment of the present disclosure.
Figure 16:
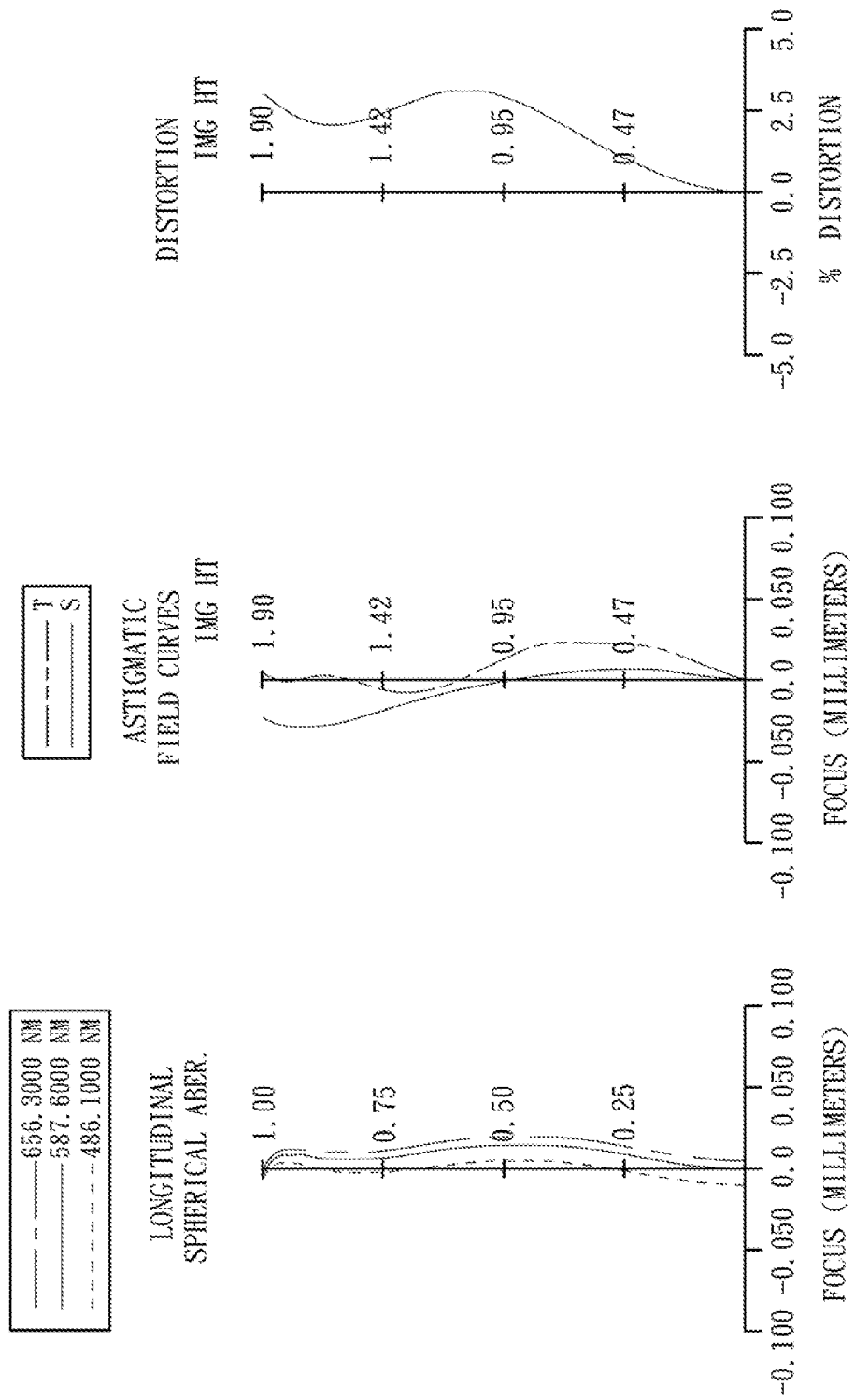
FIG. 16 shows spherical aberration curves, astigmatic field curves and a distortion curve of the image capturing optical system according to the 8th embodiment.

FIG. 15 is a schematic view of an image capturing optical system according to the 8th embodiment of the present disclosure. FIG. 16 shows spherical aberration curves, astigmatic field curves and a distortion curve of the image capturing optical system according to the 8th embodiment. In FIG. 15, the image capturing optical system includes, in order from an object side to an image side, an aperture stop 800, the first lens element 810, the second lens element 820, the third lens element 830, the fourth lens element 840, the fifth lens element 850, an IR-cut filter 870, an image plane 860 and an image sensor 880.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a concave object-side surface 821 and a convex image-side surface 822, and is made of plastic material. The object-side surface 821 and the image-side surface 822 of the second lens element 820 are aspheric. Furthermore, the second lens element 820 has inflection points formed on the age-side surface 822 thereof.

The third lens element 830 with positive refractive power has a convex object-side surface 831 and a concave image-side surface 832, and is made of plastic material. The object-side surface 831 and the image-side surface 832 of the third lens element 830 are aspheric.

The fourth lens element 840 with positive refractive power has a concave object-side surface 841 and a convex image-side surface 842, and is made of plastic material. The object-side surface 841 and the image-side surface 842 of the fourth lens element 840 are aspheric.

The fifth lens element 850 with negative refractive power has a convex object-side surface 851 and a concave image-side surface 852, and is made of plastic material. The object-side surface 851 and the image-side surface 852 of the fifth lens element 850 are aspheric. Furthermore, the fifth lens element 850 has inflection points formed on the object-side surface 851 and the image-side surface 852 thereof.

The IR-cut filter 870 is made of glass, and located between the fifth lens element 850 and the image plane 860, and will not affect the focal length of the image capturing optical system.

The detailed optical data of the 8th embodiment are shown in Table 15 and the aspheric surface data are shown in Table 16 below.

TABLE 15

8th Embodiment
f = 2.18 mm, Fno = 2.10, HFOV = 40.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.144 | | | | |
| 2 | Lens 1 | 0.965787 (ASP) | 0.326 | Plastic | 1.544 | 55.9 | 2.14 |
| 3 | | 4.961452 (ASP) | 0.167 | | | | |
| 4 | Lens 2 | −2.166106 (ASP) | 0.163 | Plastic | 1.634 | 23.8 | −3.54 |
| 5 | | −62.743544 (ASP) | 0.054 | | | | |
| 6 | Lens 3 | 2.298268 (ASP) | 0.222 | Plastic | 1.544 | 55.9 | 7.66 |
| 7 | | 4.951807 (ASP) | 0.251 | | | | |
| 8 | Lens 4 | −1.688394 (ASP) | 0.476 | Plastic | 1.544 | 55.9 | 1.13 |
| 9 | | −0.496978 (ASP) | 0.066 | | | | |
| 10 | Lens 5 | 3.648117 (ASP) | 0.271 | Plastic | 1.544 | 55.9 | −1.15 |

TABLE 15-continued

8th Embodiment
f = 2.18 mm, Fno = 2.10, HFOV = 40.2 deg.

| Surface # | | Curvature Radius | Thickness | Material | Index | Abbe # | Focal length |
|---|---|---|---|---|---|---|---|
| 11 | | 0.519046 (ASP) | 0.360 | | | | |
| 12 | IR-cut filter | Plano | 0.145 | Glass | 1.517 | 64.2 | — |
| 13 | | Plano | 0.369 | | | | |
| 14 | Image | Plano | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −2.07251E−01 | −1.00000E+00 | −2.47849E+01 | 2.00000E+01 | −4.37315E+01 |
| A4 = | 6.13699E−02 | 9.25144E−02 | 3.05431E−01 | 5.39768E−01 | −1.67592E−01 |
| A6 = | 2.86124E−01 | −7.84402E−01 | −8.00284E−01 | −2.15247E−01 | −2.22128E−01 |
| A8 = | −1.69523E+00 | 2.93828E+00 | −1.60644E+00 | −1.00727E−01 | −8.16566E−01 |
| A10 = | 8.40476E+00 | −1.40005E+01 | −3.16885E+00 | −4.91047E−01 | 4.57345E+00 |
| A12 = | −1.73669E+01 | 7.80583E+00 | −2.85301E+00 | −4.39649E+00 | −2.85999E+00 |
| A14 = | −6.11284E+00 | −2.44214E+01 | −9.47477E+00 | 1.86141E+01 | −1.73259E+00 |

| Surface # | 7 | 8 | 9 | 10 | 11 |
|---|---|---|---|---|---|
| k = | −1.00000E+00 | −1.00000E+00 | −4.01297E+00 | −5.54448E+00 | −5.96461E+00 |
| A4 = | −2.40970E−01 | 1.18162E−01 | −6.30629E−01 | −4.37007E−01 | −2.73998E−01 |
| A6 = | −1.12061E−01 | −1.80113E−02 | 1.32480E+00 | 4.40519E−02 | 1.65988E−01 |
| A8 = | −2.82276E−01 | 1.05923E−01 | −2.19701E+00 | 1.97481E−01 | −1.00128E−01 |
| A10 = | −4.77197E−01 | −9.01401E−01 | 2.61826E+00 | −1.60832E−01 | 3.60458E−02 |
| A12 = | −6.28703E−02 | −5.38317E−01 | −1.28437E+00 | 8.26401E−02 | −8.52712E−03 |
| A14 = | 3.62427E+00 | 1.77197E+00 | 9.73221E−02 | −2.00482E−02 | 1.11965E−03 |

In the optical image lens system according to the 8th embodiment, the definitions of f, Fno, FOV, R1, R2, R3, R4, T12, T45, Td, BFL, TTL, f2, f3, f4 and ImgH are the same as those stated in the 1st embodiment with corresponding values for the 8th embodiment. Moreover, these parameters can be calculated from Table 15 and Table 16 as the following values and satisfy the following relationships:

| | |
|---|---|
| f (mm) | 2.18 |
| Fno | 2.10 |
| FOV (deg.) | 80.4 |
| R1/R2 | 0.19 |
| R3/R4 | 0.03 |
| T12/T45 | 2.54 |
| (Td × f) + (BFL × f) (mm²) | 6.15 |
| TTL (mm) | 2.82 |
| f/f2 | −0.62 |
| f/f3 | 0.28 |
| f/f4 | 1.92 |
| TTL/ImgH | 1.49 |

9th Embodiment

Figure 17:
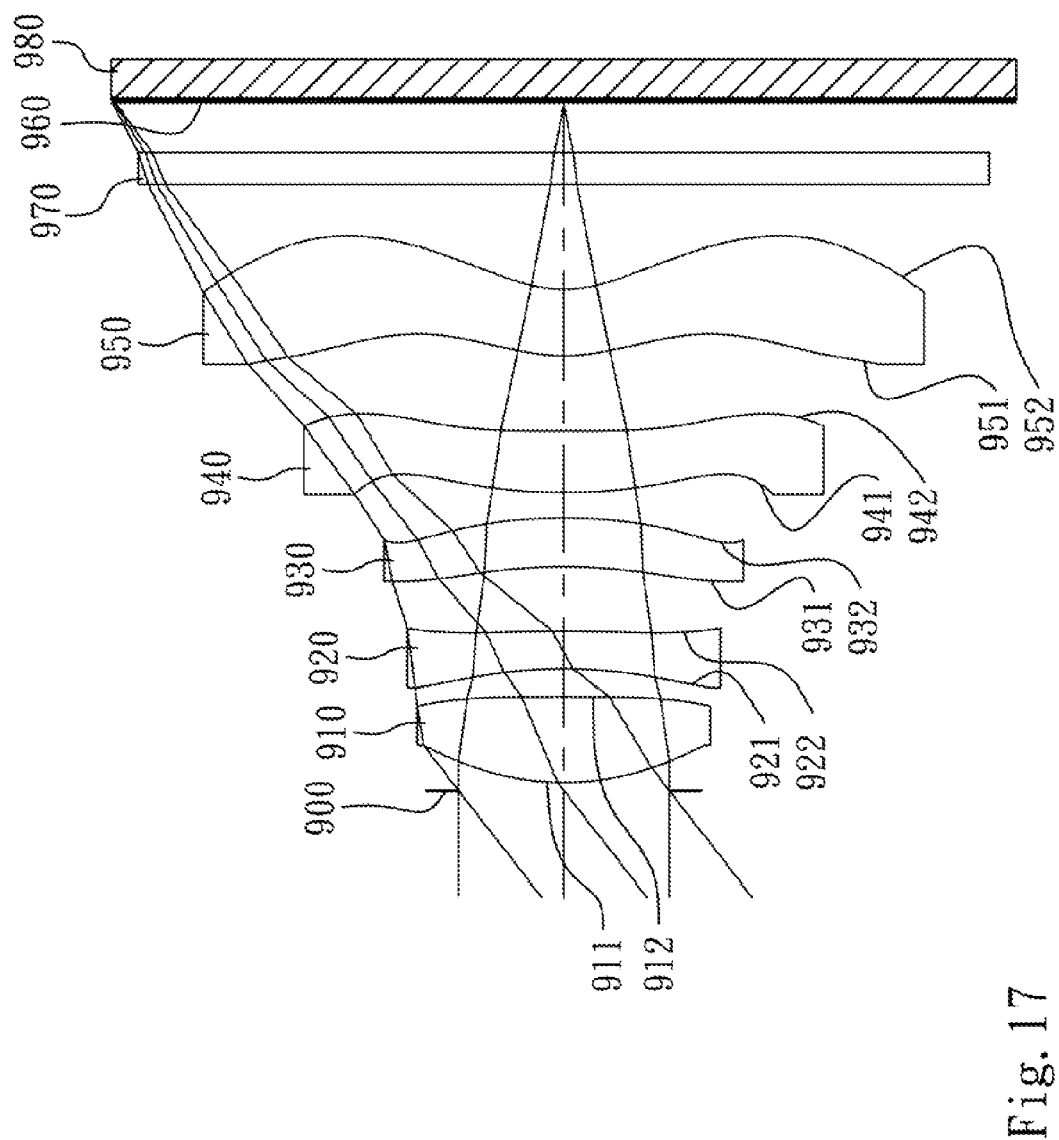
FIG. 17 is a schematic view of an image capturing optical system according to the 9th embodiment of the present disclosure.
Figure 18:
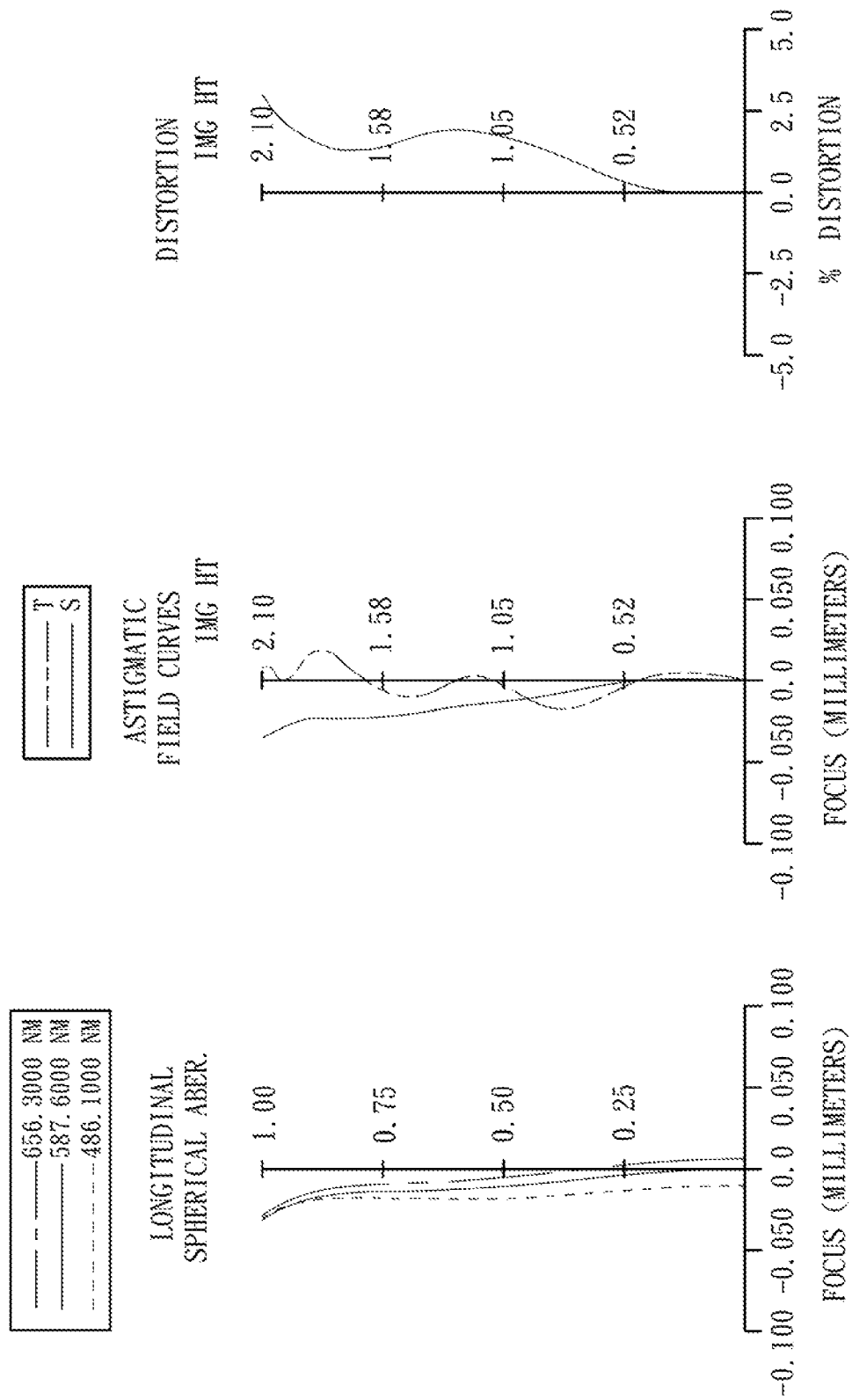
FIG. 18 shows spherical aberration curves, astigmatic field curves and a distortion curve of the image capturing optical system according to the 9th embodiment.

FIG. 17 is a schematic view of an image capturing optical system according to the 9th embodiment of the present disclosure. FIG. 18 shows spherical aberration curves, astigmatic field curves and a distortion curve of the image capturing optical system according to the 9th embodiment. In FIG. 17, the image capturing optical system includes, in order from an object side to an image side, an aperture stop 900, the first lens element 910, the second lens element 920, the third lens element 930, the fourth lens element 940, the fifth lens element 950, an IR-cut filter 970, an image plane 960 and an image sensor 980.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a concave object-side surface 921 and a convex image-side surface 922, and is made of plastic material. The object-side surface 921 and the image-side surface 922 of the second lens element 920 are aspheric. Furthermore, the second lens element 920 has inflection points formed on the age-side surface 922 thereof.

The third lens element 930 with negative refractive power has a concave object-side surface 931 and a convex image-side surface 932, and is made of plastic material. The object-side surface 931 and the image-side surface 932 of the third lens element 930 are aspheric.

The fourth lens element 940 with positive refractive power has a convex object-side surface 941 and a concave image-side surface 942, and is made of plastic material. The object-side surface 941 and the image-side surface 942 of the fourth lens element 940 are aspheric.

The fifth lens element 950 with negative refractive power has a convex object-side surface 951 and a concave image-side surface 952, and is made of plastic material. The object-side surface 951 and the image-side surface 952 of the fifth lens element 950 are aspheric. Furthermore, the fifth lens element 950 has inflection points formed on the object-side surface 951 and the image-side surface 952 thereof.

The IR-cut filter 970 is made of glass, and located between the fifth lens element 950 and the image plane 960, and will not affect the focal length of the image capturing optical system.

The detailed optical data of the 9th embodiment are shown in Table 17 and the aspheric surface data are shown in Table 18 below.

TABLE 17

9th Embodiment
f = 2.65 mm, Fno = 2.70, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.037 | | | | |
| 2 | Lens 1 | 1.243280 (ASP) | 0.400 | Plastic | 1.535 | 56.3 | 2.24 |
| 3 | | −28.508600 (ASP) | 0.127 | | | | |
| 4 | Lens 2 | −2.290840 (ASP) | 0.179 | Plastic | 1.650 | 21.4 | −5.61 |
| 5 | | −6.365100 (ASP) | 0.300 | | | | |
| 6 | Lens 3 | −2.475610 (ASP) | 0.224 | Plastic | 1.530 | 55.8 | −62.38 |
| 7 | | −2.759870 (ASP) | 0.122 | | | | |
| 8 | Lens 4 | 2.922500 (ASP) | 0.285 | Plastic | 1.535 | 56.3 | 5.68 |
| 9 | | 75.700200 (ASP) | 0.352 | | | | |
| 10 | Lens 5 | 0.848740 (ASP) | 0.307 | Plastic | 1.535 | 56.3 | −5.20 |
| 11 | | 0.568370 (ASP) | 0.490 | | | | |
| 12 | IR-cut filter | Plano | 0.147 | Glass | 1.517 | 64.2 | — |
| 13 | | Plano | 0.247 | | | | |
| 14 | Image | Plano | — | | | | |

Note:
Reference wavelength (d-line) is 587.6 nm.

TABLE 18

Aspheric Coefficients

| Surface # | 2 | 3 | 4 | 5 | 6 |
|---|---|---|---|---|---|
| k = | −1.32108E+00 | 1.00000E+01 | −6.66323E+00 | −3.75042E+00 | 1.00000E+00 |
| A4 = | 6.99573E−02 | −1.54804E−01 | −9.72602E−02 | 1.40343E−01 | 5.97287E−02 |
| A6 = | −4.02963E−02 | 1.17793E−02 | 2.76416E−01 | 3.10055E−01 | 8.31241E−02 |
| A8 = | −1.97692E−01 | −2.95523E−01 | −2.30543E−02 | −3.98458E−01 | 4.73879E−01 |
| A10 = | 1.69712E−01 | 4.87111E−01 | | | −5.24266E−01 |

| Surface # | 7 | 8 | 9 | 10 | 11 |
|---|---|---|---|---|---|
| k = | 1.00000E+00 | −1.84519E+01 | −9.00000E+01 | −5.30544E+00 | −3.65807E+00 |
| A4 = | −1.88552E−01 | 3.61003E−01 | 3.68274E−01 | −5.48765E−01 | −3.33677E−01 |
| A6 = | 1.45611E−01 | −1.00681E+00 | −3.16992E−01 | 3.98241E−01 | 2.42605E−01 |
| A8 = | 1.50539E−01 | 1.36848E+00 | −3.57272E−03 | −1.49989E−01 | −1.17400E−01 |
| A10 = | 2.18242E−01 | −1.46717E+00 | −2.10565E−01 | 4.01143E−02 | 2.52897E−02 |
| A12 = | | 5.79545E−01 | 4.52668E−01 | −7.25222E−03 | 2.33483E−05 |
| A14 = | | | −2.73700E−01 | 3.93361E−04 | −5.21024E−04 |
| A16 = | | | 5.38834E−02 | | |

In the optical image lens system according to the 9th embodiment, the definitions of f, Fno, FOV, R1, R2, R3, R4, T12, T45, Td, BFL, TTL, f2, f3, f4 and ImgH are the same as those stated in the 1st embodiment with corresponding values for the 9th embodiment. Moreover, these parameters can be calculated from Table 17 and Table 18 as the following values and satisfy the following relationships:

| f (mm) | 2.65 |
|---|---|
| Fno | 2.70 |
| FOV (deg.) | 75.4 |
| R1/R2 | −0.04 |
| R3/R4 | 0.36 |
| T12/T45 | 0.36 |
| (Td × f) + (BFL × f) (mm$^2$) | 8.30 |
| TTL (mm) | 3.13 |

| f/f2 | −0.47 |
|---|---|
| f/f3 | −0.04 |
| f/f4 | 0.47 |
| TTL/ImgH | 1.49 |

10 th Embodiment

Figure 19:
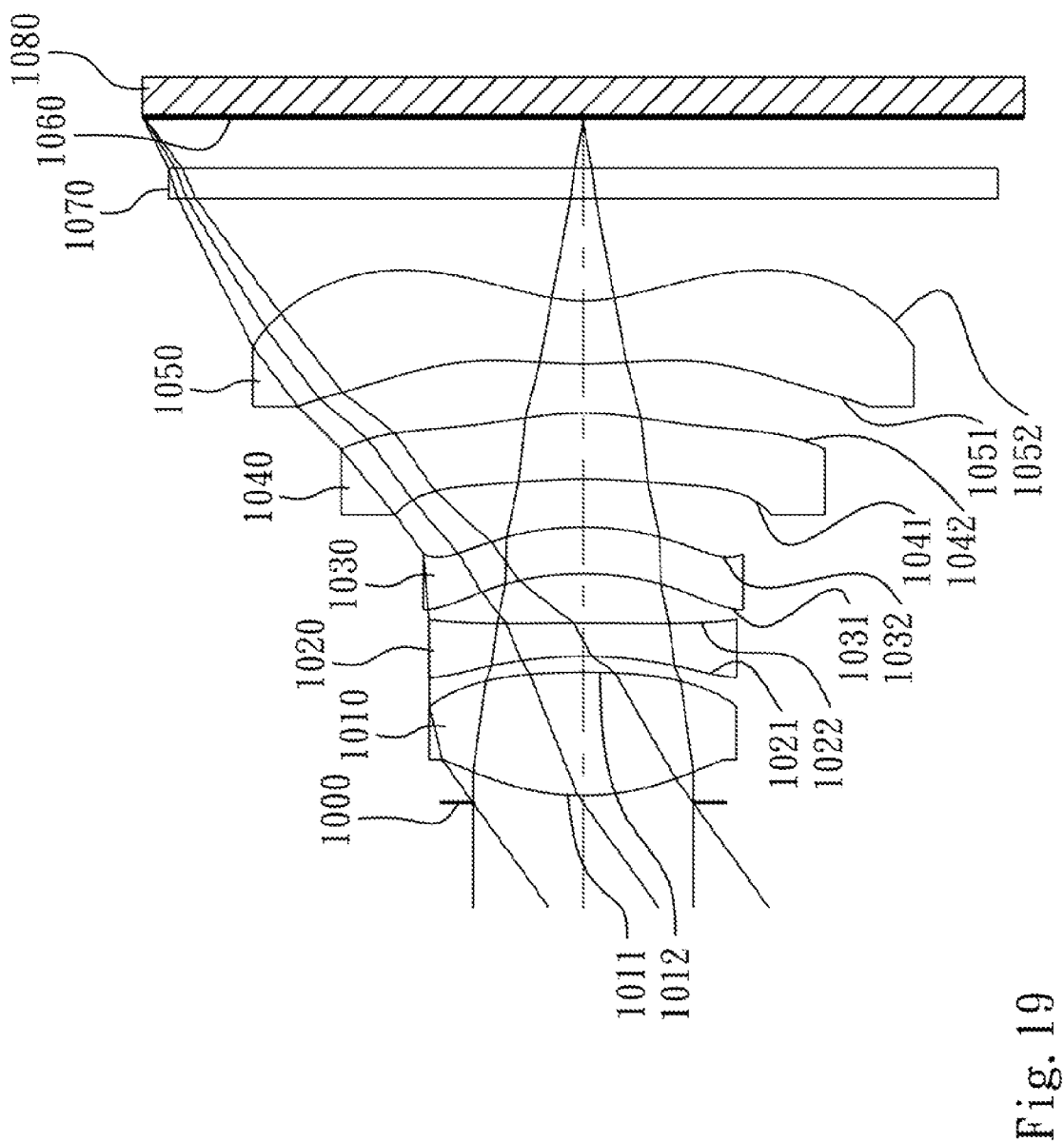
FIG. 19 is a schematic view of an image capturing optical system according to the 10th embodiment of the present disclosure.
Figure 20:
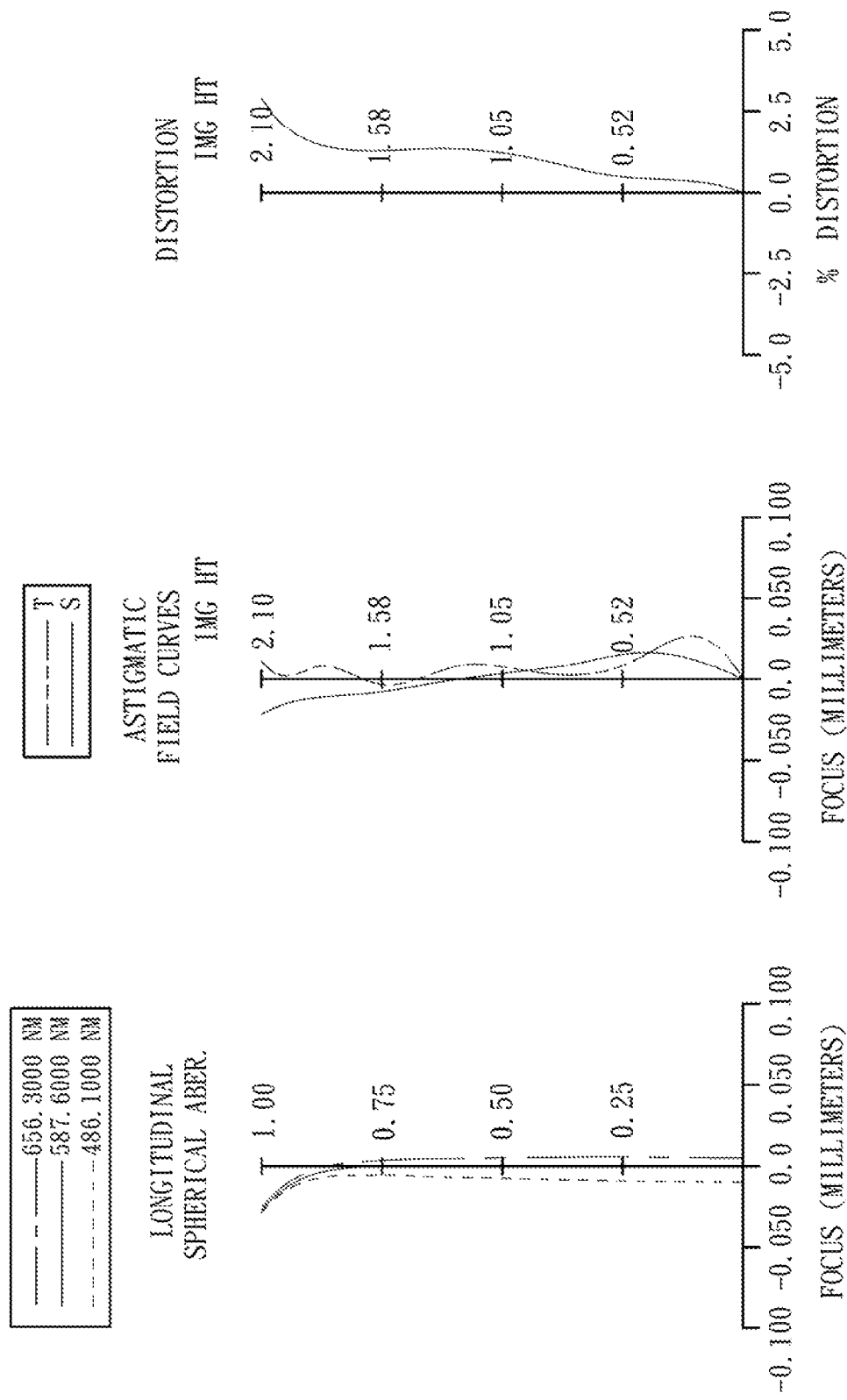
FIG. 20 shows spherical aberration curves, astigmatic field curves and a distortion curve of the image capturing optical system according to the 10th embodiment.

FIG. 19 is schematic view of an image capturing optical system according to the 10th embodiment of the present disclosure. FIG. 20 shows spherical aberration curves, astigmatic field curves and a distortion curve of the image capturing optical system according to the 10th embodiment. In FIG. 19, the image capturing optical system includes, in order from an object side to an image side, an aperture stop 1000 the first lens element 1010, the second lens element 1020, the third lens element 1030, the fourth lens element 1040, the fifth lens element 1050, an IR-cut filter 1070, an image plane 1060 and an image sensor 1080.

The first lens element 1010 with positive refractive power has a convex object-side surface 1011 and a convex image-side surface 1012, and is made of plastic material. The object-side surface 1011 and the image-side surface 1012 of the first lens element 1010 are aspheric.

The second lens element 1020 with negative refractive power has a concave object-side surface 1021 and a convex image-side surface 1022, and is made of plastic material. The object-side surface 1021 and the image-side surface 1022 of the second lens element 1020 are aspheric. Furthermore, the second lens element 1020 has inflection points formed on the image-side surface 1022 thereof.

The third lens element 1030 with positive refractive power has a concave object-side surface 1031 and a convex image-side surface 1032, and is made of plastic material. The object-side surface 1031 and the image-side surface 1032 of the third lens element 1030 are aspheric.

The fourth lens element 1040 with positive refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a convex object-side surface 1051 and a concave image-side surface 1052, and is made of plastic material. The object-side surface 1051 and the image-side surface 1052 of the fifth lens element 1050 are aspheric. Furthermore, the fifth lens element 1050 has inflection points formed on the object-side surface 1051 and the image-side surface 1052 thereof.

The IR-cut filter 1070 is made of glass, and located between the fifth lens element 1050 and the image plane 1060, and will not affect the focal length of the image capturing optical system.

The detailed optical data of the 10th embodiment are shown in Table 19 and the aspheric surface data are shown in Table 20 below.

TABLE 19

10th Embodiment
f = 2.84 mm, Fno = 2.70, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.035 | | | | |
| 2 | Lens 1 | 1.220790 (ASP) | 0.587 | Plastic | 1.544 | 55.9 | 1.74 |
| 3 | | −3.504300 (ASP) | 0.077 | | | | |
| 4 | Lens 2 | −2.099840 (ASP) | 0.160 | Plastic | 1.640 | 23.3 | −3.44 |
| 5 | | −47.326100 (ASP) | 0.234 | | | | |
| 6 | Lens 3 | −1.643400 (ASP) | 0.226 | Plastic | 1.583 | 30.2 | 11.60 |
| 7 | | −1.389190 (ASP) | 0.230 | | | | |
| 8 | Lens 4 | −2.553190 (ASP) | 0.314 | Plastic | 1.544 | 55.9 | 5.04 |
| 9 | | −1.379390 (ASP) | 0.236 | | | | |
| 10 | Lens 5 | 1.926290 (ASP) | 0.299 | Plastic | 1.535 | 56.3 | −2.23 |
| 11 | | 0.696550 (ASP) | 0.490 | | | | |
| 12 | IR-cut filter | Plano | 0.147 | Glass | 1.517 | 64.2 | — |
| 13 | | Plano | 0.247 | | | | |
| 14 | Image | Plano | — | | | | |

Note:
Reference wavelength (d-line) is 587.6 nm.

TABLE 20

Aspheric Coefficients

| Surface # | 2 | 3 | 4 | 5 | 6 |
|---|---|---|---|---|---|
| k = | −1.45145E+00 | −2.95541E+01 | 2.53165E−01 | −9.00000E+01 | 8.02149E−01 |
| A4 = | 6.69826E−02 | −2.95653E−01 | −3.86671E−02 | 2.15193E−02 | −2.97349E−01 |
| A6 = | −8.25825E−02 | −3.06119E−02 | 1.16756E−01 | 1.48614E−01 | 2.06754E−01 |
| A8 = | −1.95442E−01 | −2.87976E−01 | 2.84334E−01 | −8.65715E−02 | 1.11101E+00 |
| A10 = | −3.48209E−01 | 3.14311E−01 | | | −5.71789E−01 |

| Surface # | 7 | 8 | 9 | 10 | 11 |
|---|---|---|---|---|---|
| k = | 3.37781E−01 | 7.87664E−02 | −1.03709E+01 | −9.00000E+01 | −7.98384E+00 |
| A4 = | −9.36626E−02 | 5.61352E−01 | 3.32988E−01 | −4.21703E−01 | −2.47295E−01 |
| A6 = | 2.74801E−01 | −1.18837E+00 | −2.53826E−01 | 3.67457E−01 | 1.56141E−01 |
| A8 = | 2.33374E−01 | 1.38383E+00 | 2.45149E−03 | −1.59375E−01 | −7.84736E−02 |
| A10 = | 8.38313E−01 | −1.40689E+00 | −2.14373E−01 | 4.23725E−02 | 2.07709E−02 |
| A12 = | | 5.32774E−01 | 4.48525E−01 | −6.29482E−03 | −2.16893E−03 |
| A14 = | | | −2.77684E−01 | −1.02976E−04 | −8.15775E−05 |
| A16 = | | | 5.49272E−02 | | |

In the optical image lens system according to the 10th embodiment, the definitions of f, Fno, FOV, R1, R2, R3, R4, T12, T45, Td, BFL, TTL, f2, f3, f4 and ImgH are the same as those stated in the 1st embodiment with corresponding values for the 10th embodiment. Moreover, these parameters can be calculated from Table 19 and Table 20 as the following values and satisfy the following relationships:

| | |
|---|---|
| f (mm) | 2.84 |
| Fno | 2.70 |
| FOV (deg.) | 71.4 |
| R1/R2 | −0.35 |
| R3/R4 | 0.04 |
| T12/T45 | 0.33 |
| (Td × f) + (BFL × f) (mm$^2$) | 9.08 |
| TTL (mm) | 3.20 |
| f/f2 | −0.83 |
| f/f3 | 0.25 |
| f/f4 | 0.56 |
| TTL/ImgH | 1.52 |

11th Embodiment

Figure 21:
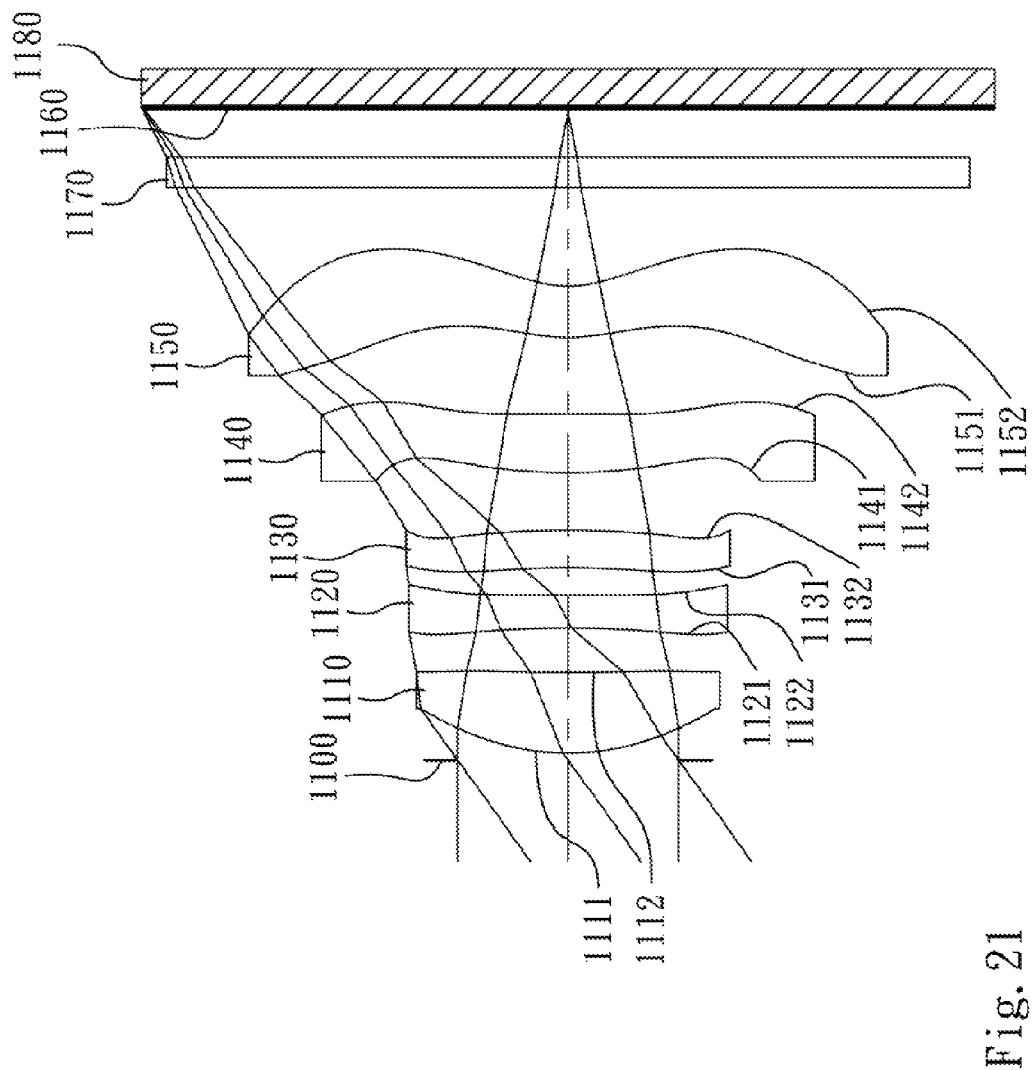
FIG. 21 is a schematic view of an image capturing optical system according to the 11th embodiment of the present disclosure.
Figure 22:
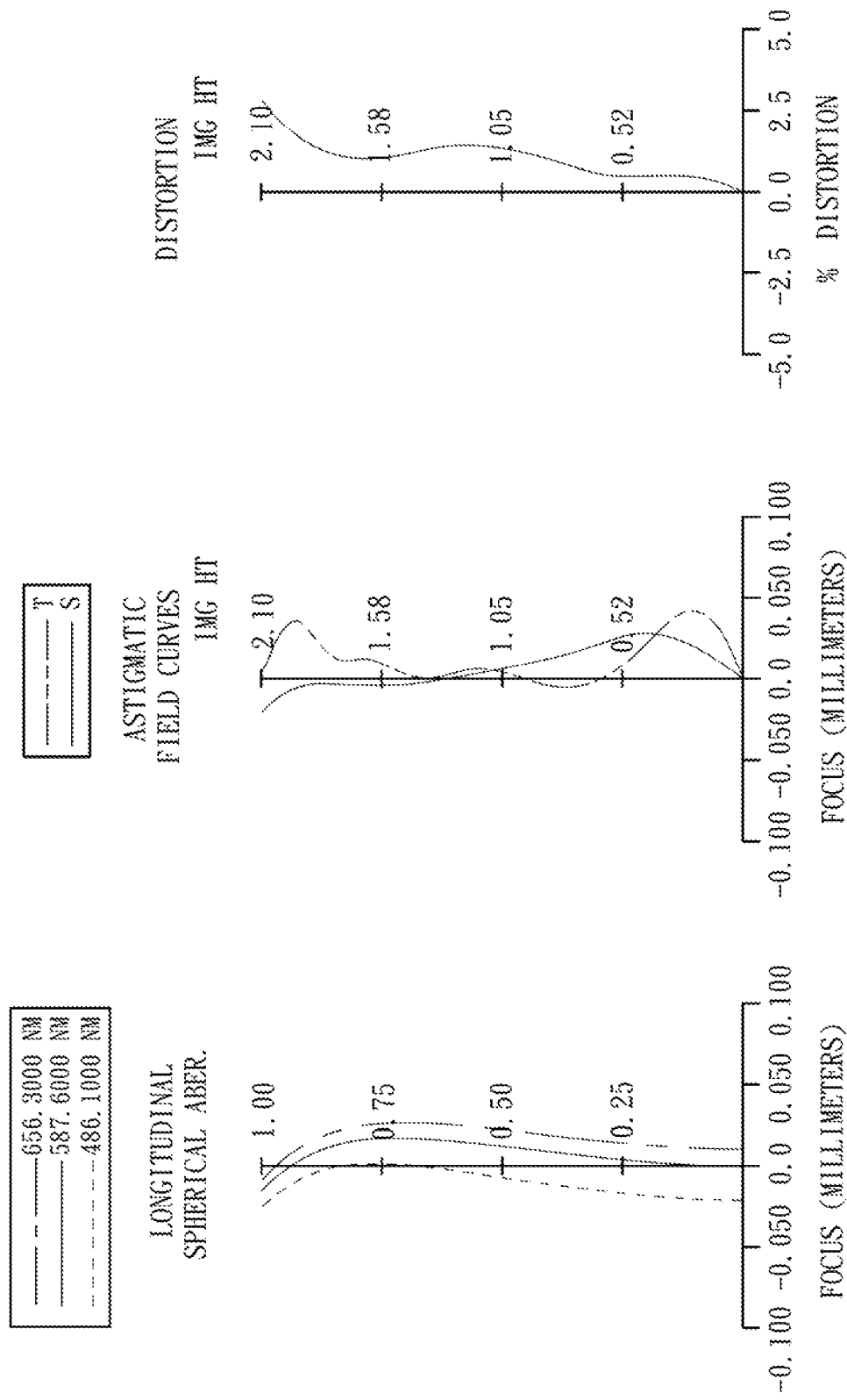
FIG. 22 shows spherical aberration curves, astigmatic field curves nd a distortion curve of the image capturing optical system according to the 11th embodiment.

FIG. 21 is schematic view of an image capturing optical system according to the 11th embodiment of the present disclosure. FIG. 22 shows spherical aberration curves, astigmatic field curves and a distortion curve of the image capturing optical system according to the 11th embodiment. In FIG. 21, the image capturing optical system includes, in order from an object side to an image side, an aperture stop 1100, the first lens element 1110, the second lens element 1120, the third lens element 1130, the fourth lens element 1140, the fifth lens element 1150, an IR-cut filter 1170, an image plane 1160 and an image sensor 1180.

The first lens element 1110 with positive refractive power has a convex object-side surface 1111 and a concave image-side surface 1112, and is made of plastic material. The object-side surface 1111 and the image-side surface 1112 of the first lens element 1110 are aspheric.

The second lens element 1120 with negative refractive power has a concave object-side surface 1121 and a convex image-side surface 1122, and is made of plastic material. The object-side surface 1121 and the image-side surface 1122 of the second lens element 1120 are aspheric. Furthermore, the second lens element 1120 has inflection points formed on the image-side surface 1122 thereof.

The third lens element 1130 with negative refractive power has a concave object-side surface 1131 and a convex image-side surface 1132, and is made of plastic material. The object-side surface 1131 and the image-side surface 1132 of the third lens element 1130 are aspheric.

The fourth lens element 1140 with positive refractive power has a convex object-side surface 1141 and a convex image-side surface 1142, and is made of plastic material. The object-side surface 1141 and the image-side surface 1142 of the fourth lens element 1140 are aspheric.

The fifth lens element 1150 with negative refractive power has a convex object-side surface 1151 and a concave image-side surface 1152, and is made of plastic material. The object-side surface 1151 and the image-side surface 1152 of the fifth lens element 1150 are aspheric. Furthermore, the fifth lens element 1150 has inflection points formed on the object-side surface 1151 and the image-side surface 1152 thereof.

The IR-cut filter 1170 is made of glass, and located between the fifth lens element 1150 and the image plane 1160, and will not affect the focal length of the image capturing optical system.

The detailed optical data of the 11th embodiment are shown in Table 21 and the aspheric surface data are shown in Table 22 below.

TABLE 21

11th Embodiment
f = 2.84 mm, Fno = 2.60, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.035 | | | | |
| 2 | Lens 1 | 1.219800 (ASP) | 0.400 | Plastic | 1.535 | 56.3 | 2.54 |
| 3 | | 10.526300 (ASP) | 0.215 | | | | |
| 4 | Lens 2 | −5.816500 (ASP) | 0.165 | Plastic | 1.650 | 21.4 | −9.75 |
| 5 | | −72.150100 (ASP) | 0.137 | | | | |
| 6 | Lens 3 | −3.751900 (ASP) | 0.185 | Plastic | 1.544 | 55.9 | −29.14 |
| 7 | | −5.000000 (ASP) | 0.285 | | | | |
| 8 | Lens 4 | 3.554900 (ASP) | 0.291 | Plastic | 1.535 | 56.3 | 4.89 |
| 9 | | −9.596400 (ASP) | 0.377 | | | | |
| 10 | Lens 5 | 0.851290 (ASP) | 0.250 | Plastic | 1.535 | 56.3 | −3.25 |
| 11 | | 0.513110 (ASP) | 0.490 | | | | |
| 12 | IR-cut filter | Plano | 0.147 | Glass | 1.517 | 64.2 | — |
| 13 | | Plano | 0.249 | | | | |
| 14 | Image | Plano | — | | | | |

Note:
Reference wavelength (d-line) is 587.6 nm.

TABLE 22

Aspheric Coefficients

| Surface # | 2 | 3 | 4 | 5 | 6 |
|---|---|---|---|---|---|
| k = | −1.48356E+00 | −8.70706E+01 | −8.62441E+00 | −9.00000E+01 | −5.84402E+01 |
| A4 = | 6.46218E−02 | −1.00064E−01 | −9.74958E−02 | 1.03087E−01 | 5.21222E−02 |
| A6 = | −6.32062E−03 | 6.43714E−02 | 2.39915E−01 | 3.09758E−01 | 1.18863E−01 |
| A8 = | −9.58044E−02 | −2.64214E−01 | 1.01268E−01 | −3.90878E−01 | 5.18111E−01 |

TABLE 22-continued

| Aspheric Coefficients | | | | |
|---|---|---|---|---|
| A10 = | 3.39768E−02 | 4.42581E−01 | | −6.72042E−01 |

| Surface # | 7 | 8 | 9 | 10 | 11 |
|---|---|---|---|---|---|
| k = | −9.00000E+01 | −2.13299E+01 | 1.00000E+00 | −1.61287E+01 | −5.88399E+00 |
| A4 = | −1.55482E−01 | 3.67746E−01 | 4.35811E−01 | −5.49149E−01 | −3.17776E−01 |
| A6 = | 1.31222E−01 | −1.00449E+00 | −3.63597E−01 | 4.14866E−01 | 2.17987E−01 |
| A8 = | 1.69033E−01 | 1.31262E+00 | −1.97618E−03 | −1.54485E−01 | −1.11018E−01 |
| A10 = | 4.58161E−01 | −1.45740E+00 | −2.03681E−01 | 3.89389E−02 | 2.48639E−02 |
| A12 = | | 5.48740E−01 | 4.55880E−01 | −7.20487E−03 | −3.77292E−04 |
| A14 = | | | −2.74013E−01 | 5.08947E−04 | −4.58865E−04 |
| A16 = | | | 5.30643E−02 | | |

In the optical image lens system according to the 11th embodiment, the definitions of f, Fno, FOV, R1, R2, R3, R4, T12, T45, Td, BFL, TTL, f2, f3, f4 and ImgH are the same as those stated in the 1st embodiment with corresponding values for the 11th embodiment. Moreover, these parameters can be calculated from Table 21 and Table 22 as the following values and satisfy the following relationships:

| | |
|---|---|
| f (mm) | 2.84 |
| Fno | 2.60 |
| FOV (deg.) | 71.4 |
| R1/R2 | 0.12 |
| R3/R4 | 0.08 |
| T12/T45 | 0.57 |
| (Td × f) + (BFL × f) (mm$^2$) | 8.91 |
| TTL (mm) | 3.14 |
| f/f2 | −0.29 |
| f/f3 | −0.10 |
| f/f4 | 0.58 |
| TTL/ImgH | 1.50 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing optical system comprising, in order from an object side to an image side:
    a first lens element with positive refractive power having a convex object-side surface;
    a second lens element with negative refractive power having a concave object-side surface and a convex image-side surface;
    a third lens element with refractive power, wherein an object-side surface and an image-side surface of the third lens element are aspheric;
    a fourth lens element with positive refractive power, wherein an object-side surface and an image-side surface of the fourth lens element are aspheric; and
    a fifth lens element with refractive power having a concave image-side surface, wherein an object-side surface and the image-side surface of the fifth lens element which is made of plastic material are aspheric, and the fifth lens element has at least one inflection point formed on at least one of the object-side surface and the image-side surface thereof;
    wherein a curvature radius of the object-side surface of the second lens element is R3, a curvature radius of the image-side surface of the second lens element is R4, a focal length of the image capturing optical system is f, an axial distance between the object-side surface of the first lens element and the image-side surface of the fifth lens element is Td, an air conversion distance between the image-side surface of the fifth lens element and an image plane is BFL, a focal length of the fourth lens element is f4, and the following relationships are satisfied:

$0 < R3/R4 < 1.0;$ $4 \text{ mm}^2 < (Td \times f) + (BFL \times f) < 10 \text{ mm}^2;$ and $0 < f/f4 < 2.2.$ 2. The image capturing optical system of claim 1, wherein the fifth lens element has negative refractive power.

3. The image capturing optical system of claim 2, wherein the fourth lens element has a convex image-side surface.

4. The image capturing optical system of claim 3, wherein the curvature radius of the object-side surface of the second lens element is R3 the curvature radius of the image-side surface of the second lens element is R4, and the following relationship is satisfied:

$0 < R3/R4 < 0.5.$

5. The image capturing optical system of claim 3, wherein the second lens element has at least one inflection point formed on the image-side surface thereof, and the fourth lens element has a concave object-side surface.

6. The image capturing optical system of claim 5, wherein the focal length of the image capturing optical system is f, the focal length of the fourth lens element is f4, and the following relationship is satisfied:

$0.4 < f/f4 < 1.7.$

7. The image capturing optical system of claim 3, wherein an axial distance between the first lens element and the second lens element is T12, an axial distance between the fourth lens element and the fifth lens element is T45, and the following relationship is satisfied:

$0.05 < T12/T45 < 0.65.$

8. The image capturing optical system of claim 4, wherein a maximum image height of the image capturing optical system is ImgH, an axial distance between the object-side surface of the first lens element and the image plane is TTL, and the following relationship is satisfied:

$TTL/\text{ImgH} < 1.7.$

9. The image capturing optical system of claim 2, wherein the axial distance between the object-side surface of the first lens element and the image plane is TTL, and the following relationship is satisfied:

1.0 mm<$TTL$<3.5 mm.

10. The image capturing optical system of claim 9, wherein a curvature radius of the object-side surface of the first lens element is R1, a curvature radius of the image-side surface of the first lens element is R2, and the following relationship is satisfied:

−0.5<$R1/R2$<0.5.

11. The image capturing optical system of claim 9, wherein the fourth lens element has a concave object-side surface and a convex image-side surface.

12. The image capturing optical system of claim 11, wherein the third lens element has a convex image-side surface, the focal length of the image capturing optical system is f, a focal length of the third lens element is f3, and the following relationship is satisfied:

−0.5<$f/f3$<0.5

13. The image capturing optical system of claim 3, wherein a maximal field of view is FOV, and the following relationship is satisfied:

73 degrees<FOV<85 degrees.

14. The image capturing optical system of claim 3, wherein a maximum image height of the image capturing optical system is ImgH, an axial distance between the object-side surface of the first lens element and the image plane is TTL, and the following relationship is satisfied:

$TTL$/Img$H$<1.55.

15. An image capturing optical system comprising, in order from an object side to an image side:
   a first lens element with positive refractive power having a convex object-side surface;
   a second lens element with negative refractive power having a concave object-side surface and a convex image-side surface;
   a third lens element with refractive power, wherein an object-side surface and an image-side surface of the third lens element are aspheric;
   a fourth lens element with positive refractive power, wherein an object-side surface and an image-side surface of the fourth lens element which is made of plastic material are aspheric; and
   a fifth lens element with negative refractive power having a concave image-side surface, wherein an object-side surface and the image-side surface of the fifth lens element which is made of plastic material are aspheric, and the fifth lens element has at least one inflection point formed on at least one of the object-side surface and the image-side surface thereof;
   wherein a curvature radius of the object-side surface of the second lens element is R3, a curvature radius of the age-side surface of the second lens element is R4, a focal length of the image capturing optical system is f, an axial distance between the object-side surface of the first lens element and the image-side surface of the fifth lens element is Td, an air conversion distance between the image-side surface of the fifth lens element and an image plane is BFL, a maximum image height of the image capturing optical system is ImgH, an axial distance between the object-side surface of the first lens element and the image plane is TTL, and the following relationships are satisfied:

0<$R3/R4$<1.0;

4 mm$^2$<($Td$×$f$)+($BFL$×$f$)<10 mm$^2$; and $TTL$/Img$H$<1.7.

16. The image capturing optical system of claim 15, wherein a curvature radius of the object-side surface of the first lens element is R1, a curvature radius of the image-side surface of the first lens element is R2, and the following relationship is satisfied:

−0.5<$R1/R2$<0.5.

17. The image capturing optical system of claim 16, wherein the second lens element has at least one inflection point formed on the image-side surface thereof.

18. The image capturing optical system of claim 16, wherein the focal length of the image capturing optical system is f, a focal length of the fourth lens element is f4, and the following relationship is satisfied:

0.4<$f/f4$<1.7.

19. The image capturing optical system of claim 16, wherein the maximum image height of the image capturing optical system is ImgH, the axial distance between the object-side surface of the first lens element and the image plane is TTL, and the following relationship is satisfied:

$TTL$/Img$H$<1.55.

20. The image capturing optical system of claim 15, wherein the axial distance between the object-side surface of the first lens element and the image plane is TTL, and the following relationship is satisfied:

1.0 mm<$TTL$<3.5 mm.

21. The image capturing optical system of claim 20, wherein an axial distance between the first lens element and the second lens element is T12, an axial distance between the fourth lens element and the fifth lens element is 145, and the following relationship is satisfied:

0.05<$T12/T45$<0.65.

22. The image capturing optical system of claim 20, wherein the third lens element has a convex image-side surface, the focal length of the image capturing optical system is f, a focal length of the second lens element is f2, and the following relationship is satisfied:

−1.0<$f/f2$<−0.2.

23. The image capturing optical system of claim 20, wherein the focal length of the image capturing optical system is f, and the following relationship satisfied:

1.5 mm<$f$<3.0 mm.

* * * * *

UNITED STATES PATENT AND TRADEMARK OFFICE
CERTIFICATE OF CORRECTION

PATENT NO.       : 8,605,368 B2
APPLICATION NO.  : 13/612810
DATED            : December 10, 2013
INVENTOR(S)      : Tsung-Han Tsai and Hsin-Hsuan Huang It is certified that error appears in the above-identified patent and that said Letters Patent is hereby corrected as shown below:

In the Claims

In column 37, claim 15, line 56-58 of the issued patent should be changed as follows:

... wherein a curvature radius of the object-side surface of the second lens element is R3, a curvature radius of the ~~age~~image-side surface of the second lens element is R4, ...

In column 38, claim 21, line 44 and 45 of the issued patent should be changed as follows:

... T12, an axial distance between the fourth lens element and the fifth lens element is ~~145~~T45, ...

Signed and Sealed this
Twenty-seventh Day of May, 2014

Michelle K. Lee
*Deputy Director of the United States Patent and Trademark Office*